US012651222B2

(12) United States Patent
Lu

(10) Patent No.: US 12,651,222 B2
(45) Date of Patent: Jun. 9, 2026

(54) APPARATUSES, COMPUTER-IMPLEMENTED METHODS, AND COMPUTER PROGRAM PRODUCTS FOR IMPROVED OPTIMIZATION INCORPORATING UNCERTAIN SCHEDULED DISTURBANCE FAILSAFE

(71) Applicant: Honeywell International Inc., Charlotte, NC (US)

(72) Inventor: Joseph Z. Lu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 93 days.

(21) Appl. No.: 18/347,255

(22) Filed: Jul. 5, 2023

(65) Prior Publication Data

US 2025/0013959 A1    Jan. 9, 2025

(51) Int. Cl.
*G06Q 10/0633* (2023.01)
(52) U.S. Cl.
CPC ................................. *G06Q 10/0633* (2013.01)
(58) Field of Classification Search
CPC .................................................... G06Q 10/0633
See application file for complete search history.

(56) References Cited

U.S. PATENT DOCUMENTS

| | | | | |
|---|---|---|---|---|
| 2013/0275187 A1* | 10/2013 | Patel | ................ | G06Q 10/06398 |
| | | | | 705/7.42 |
| 2014/0058534 A1* | 2/2014 | Tiwari | ................... | G05B 13/04 |
| | | | | 700/9 |

| | | | | |
|---|---|---|---|---|
| 2014/0282257 A1* | 9/2014 | Nixon | ................. | G06F 3/04842 |
| | | | | 715/835 |
| 2016/0334122 A1* | 11/2016 | Shiel | ......................... | F24F 11/30 |
| 2016/0334126 A1* | 11/2016 | Shiel | ...................... | G06Q 10/06 |
| 2020/0142364 A1* | 5/2020 | Craig | ...................... | G05B 13/04 |
| 2022/0044538 A1* | 2/2022 | Al-Yousef | ............. | G08B 21/02 |

(Continued)

OTHER PUBLICATIONS

Clavijo, Nayher, et al. "Development and Application of a Data-Driven System for Sensor Fault Diagnosis in an Oil Processing Plant." Processes 7.7 (2019): 436. (Year: 2019).*

(Continued)

*Primary Examiner* — Andre D Boyce
(74) *Attorney, Agent, or Firm* — Alston & Bird LLP

(57) ABSTRACT

Embodiments provide for improved optimization associated with a dynamic control scheme (e.g., an MPC architecture). Some embodiments identify at a first timestamp prior to a planned start time of a scheduled event associated with a processing unit, an adjustment value associated with the scheduled event. The adjustment value may be defined based on a predicted possible worst scenario of starting the scheduled event at a start time that differs from the planned start time. Some embodiments update a corrective response model to include the adjustment value. The corrective response model may comprise a step response matrix, an input vector parameter, and a constraint failsafe parameter. Some embodiments generate, using the corrective response model and based at least in part on operating condition data associated with the scheduled event, an optimization adjustment data, and generate updated optimization data by applying the optimization adjustment data to offset initial optimization data.

20 Claims, 11 Drawing Sheets

(56) References Cited

U.S. PATENT DOCUMENTS

| 2023/0100635 A1* | 3/2023 | Alkhabbaz | G06Q 10/0631 |
| | | | 340/540 |
| 2024/0168860 A1* | 5/2024 | Arlitt | G06F 11/3447 |
| 2024/0201639 A1* | 6/2024 | Copperthite | G05B 19/418 |
| 2024/0377810 A1* | 11/2024 | Nguyen | G05B 19/4155 |
| 2024/0378534 A1* | 11/2024 | Honey | G06Q 10/0635 |

OTHER PUBLICATIONS

Qin, S. Joe, and Thomas A. Badgwell. "A survey of industrial model predictive control technology." Control engineering practice 11.7 (2003): 733-764. (Year: 2003).*
Extended European Search Report and Declaration Mailed on Mar. 21, 2025 for EP Application No. 24181264, 8 page(s).

* cited by examiner

APPARATUSES, COMPUTER-IMPLEMENTED METHODS, AND COMPUTER PROGRAM PRODUCTS FOR IMPROVED OPTIMIZATION INCORPORATING UNCERTAIN SCHEDULED DISTURBANCE FAILSAFE

TECHNICAL FIELD

Embodiments of the present disclosure generally provide for improved process optimization, and specifically provide for improved process optimization that incorporates a failsafe for uncertain scheduled disturbances.

BACKGROUND

In various contexts, optimization of a particular oil refinery, petrochemical plant, or other processing plant is performed to facilitate operation of the plant in a manner that meets goal criteria. Often, existing optimization algorithms operate based on particular assumptions.

Applicant has discovered problems with current implementations of optimizing operation of a processing plant, specifically for plants with one or more discontinuous processes and/or plants supplying one or more discontinuous processes. Through applied effort, ingenuity, and innovation, Applicant has solved many of these identified problems by developing solutions embodied in the present disclosure, which are described in detail below.

BRIEF SUMMARY

In accordance with one aspect of the present disclosure, a computer-implemented method for improved optimization associated with a dynamic control scheme (e.g., an MPC architecture) is provided. The computer-implemented method is executable utilizing any of a myriad of computing device(s) and/or combinations of hardware, software, and/or firmware. In some example embodiments, an example computer-implemented method includes identifying at a first timestamp prior to a planned start time of a scheduled event associated with a processing unit, an adjustment value associated with the scheduled event, wherein the adjustment value is defined based on a predicted possible worst scenario of starting the scheduled event at a start time that differs from the planned start time; updating a corrective response model to include the adjustment value, wherein the corrective response model comprises (i) a step response matrix associated with the scheduled event, (ii) an input vector parameter, and (iii) a constraint failsafe parameter; generating, using the corrective response model and based at least in part on operating condition data associated with the scheduled event, an optimization adjustment data; and generating updated optimization data by applying the optimization adjustment data to offset initial optimization data, wherein the updated optimization data comprises a predicted constraint value that reflects the predicted possible worst scenario of starting the scheduled event at a start time that differs from the planned start time.

In some example embodiments, updating the corrective response model to include the adjustment value, comprises setting the constraint failsafe parameter to the adjustment value.

In some example embodiments, the example computer-implemented method further includes determining, a state of the scheduled event at a sampling instance subsequent to the planned start time; in response to determining at the sampling instance subsequent to the planned start time that the scheduled event has not started, adjusting the input vector parameter associated with the corrective response model, and generating based at least in part on the corrective response model, updated optimization adjustment data.

In some example embodiments, the example computer-implemented method further includes determining, a state of the scheduled event at a sampling instance subsequent to the planned start time; in response to determining at the sampling instance subsequent to the planned start time that the scheduled event has started, updating the corrective response model to exclude the adjustment value; and generating, based at least in part on the corrective response model, updated optimization adjustment data.

In some example embodiments, the scheduled event is discontinuous processing operation performed by the processing unit.

In some example embodiments, the updated optimization data comprises predicted inventory level of a product repository that supplies a product utilized by the processing unit to perform the scheduled event.

In some example embodiments, the scheduled event is associated with an operating mode of a plurality of operating modes of the processing unit.

In some example embodiments, the adjustment value is determined based at least in part on historical operating data associated with operating mode associated with the scheduled event.

In some example embodiments, identifying the adjustment value comprises retrieving the adjustment value from a database.

In some example embodiments, the example computer-implemented method further includes outputting the updated optimization data.

In accordance with another aspect of the present disclosure, an apparatus for improved optimization associated with a dynamic control scheme (e.g., an MPC architecture) is provided. The apparatus in some embodiments includes at least one processor and at least one non-transitory memory, the at least one non-transitory memory having computer-coded instructions stored thereon. The computer-coded instructions in execution with the at least one processor causes the apparatus to perform any of the example computer-implemented methods described herein. In some other embodiments, the apparatus includes means for performing each step of any of the computer-implemented methods described herein.

In accordance with another aspect of the present disclosure, a computer program product for improved optimization associated with a dynamic control scheme (e.g., an MPC architecture) is provided. The computer program product in some embodiments includes at least one non-transitory computer-readable storage medium having computer program code stored thereon. The computer program code in execution with at least one processor is configured for performing any one or the example computer-implemented methods described herein.

BRIEF DESCRIPTION OF THE SEVERAL VIEWS OF THE DRAWINGS

Figure 1:
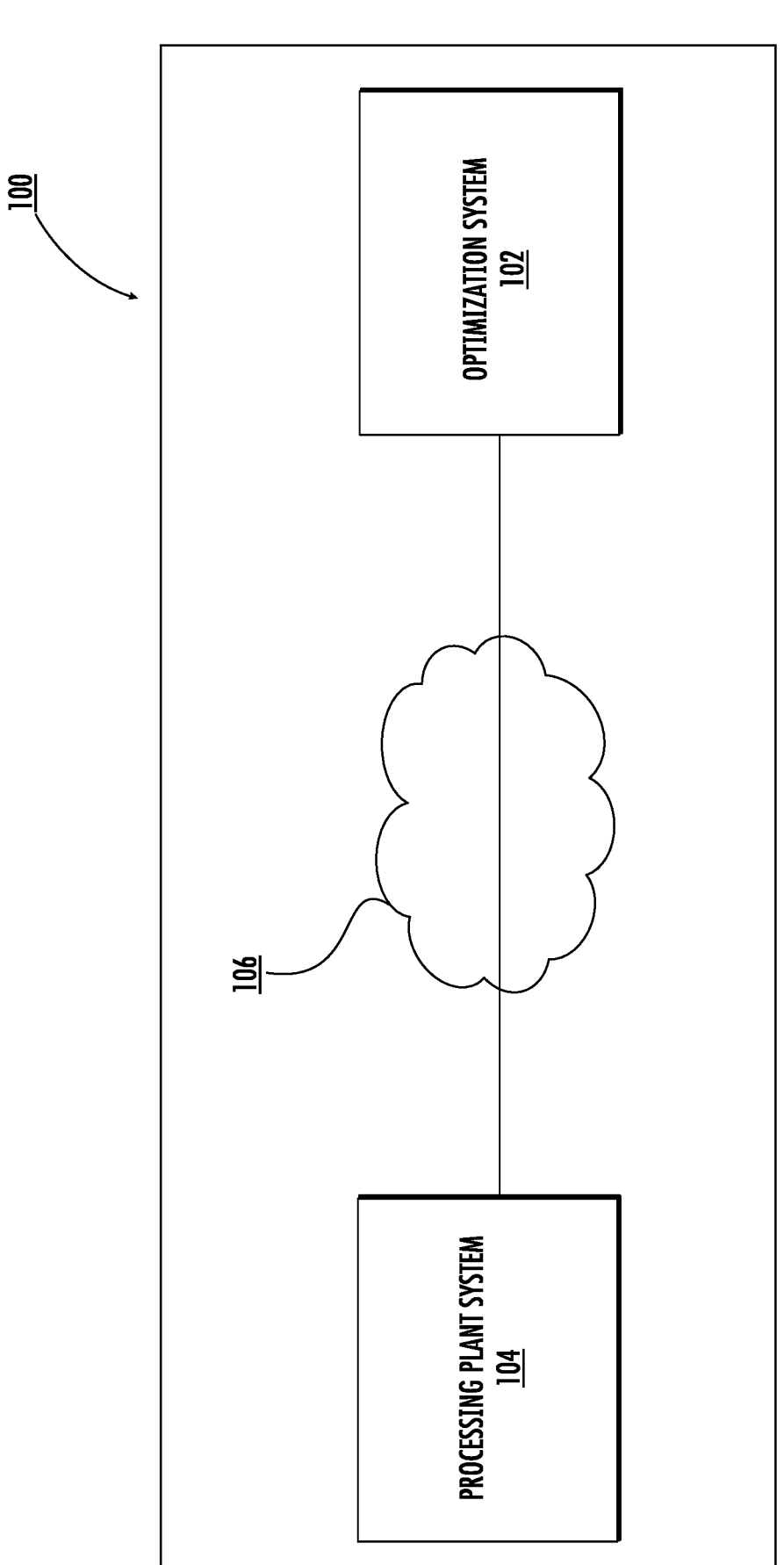

Having thus described the embodiments of the disclosure in general terms, reference now will be made to the accompanying drawings, which are not necessarily drawn to scale, and wherein:

FIG. 1 illustrates a block diagram of an example system in which embodiments of the present disclosure may operate.

Figure 2:
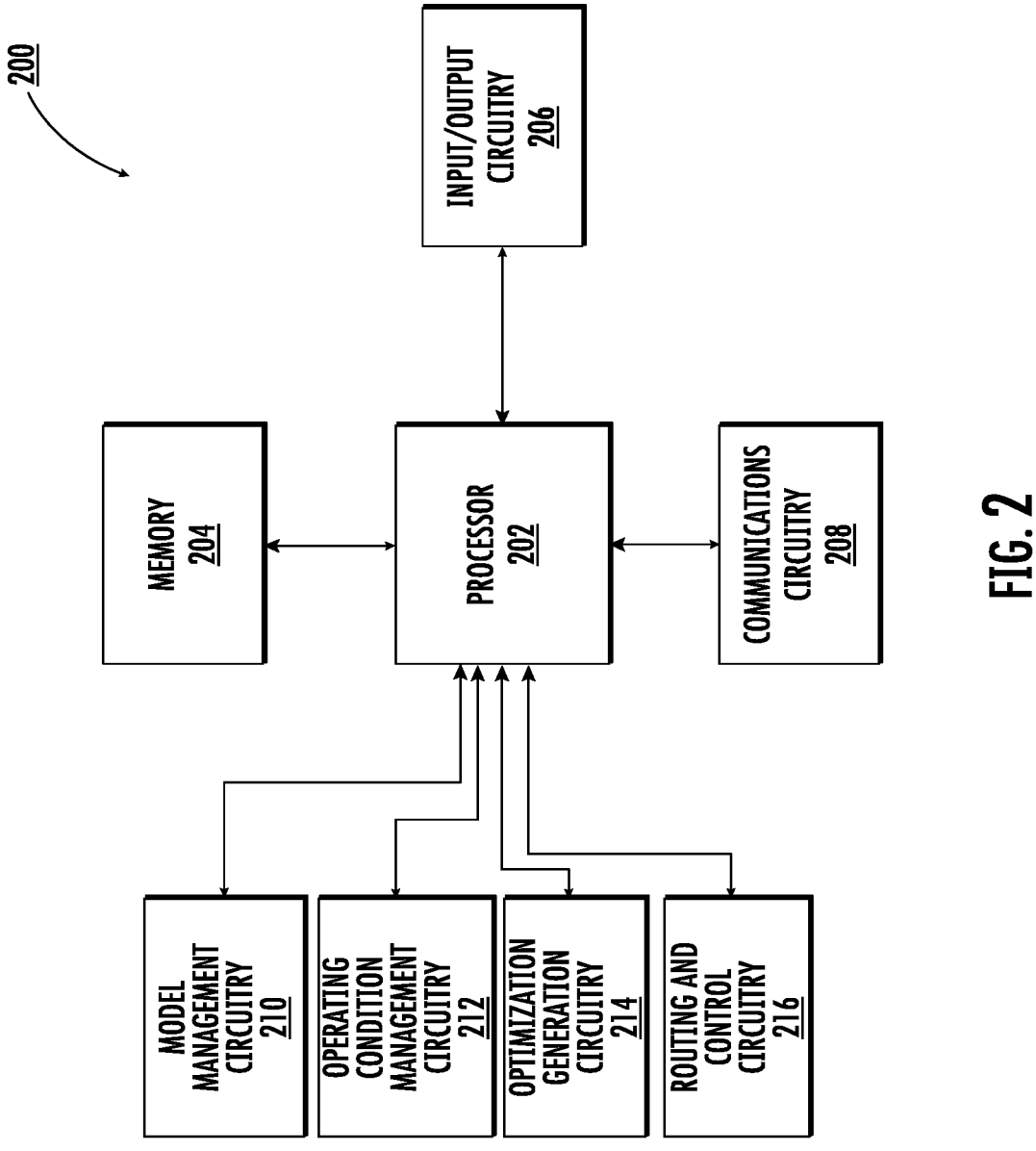

FIG. 2 illustrates a block diagram of an example apparatus in accordance with at least one example embodiment of the present disclosure.

Figure 3:
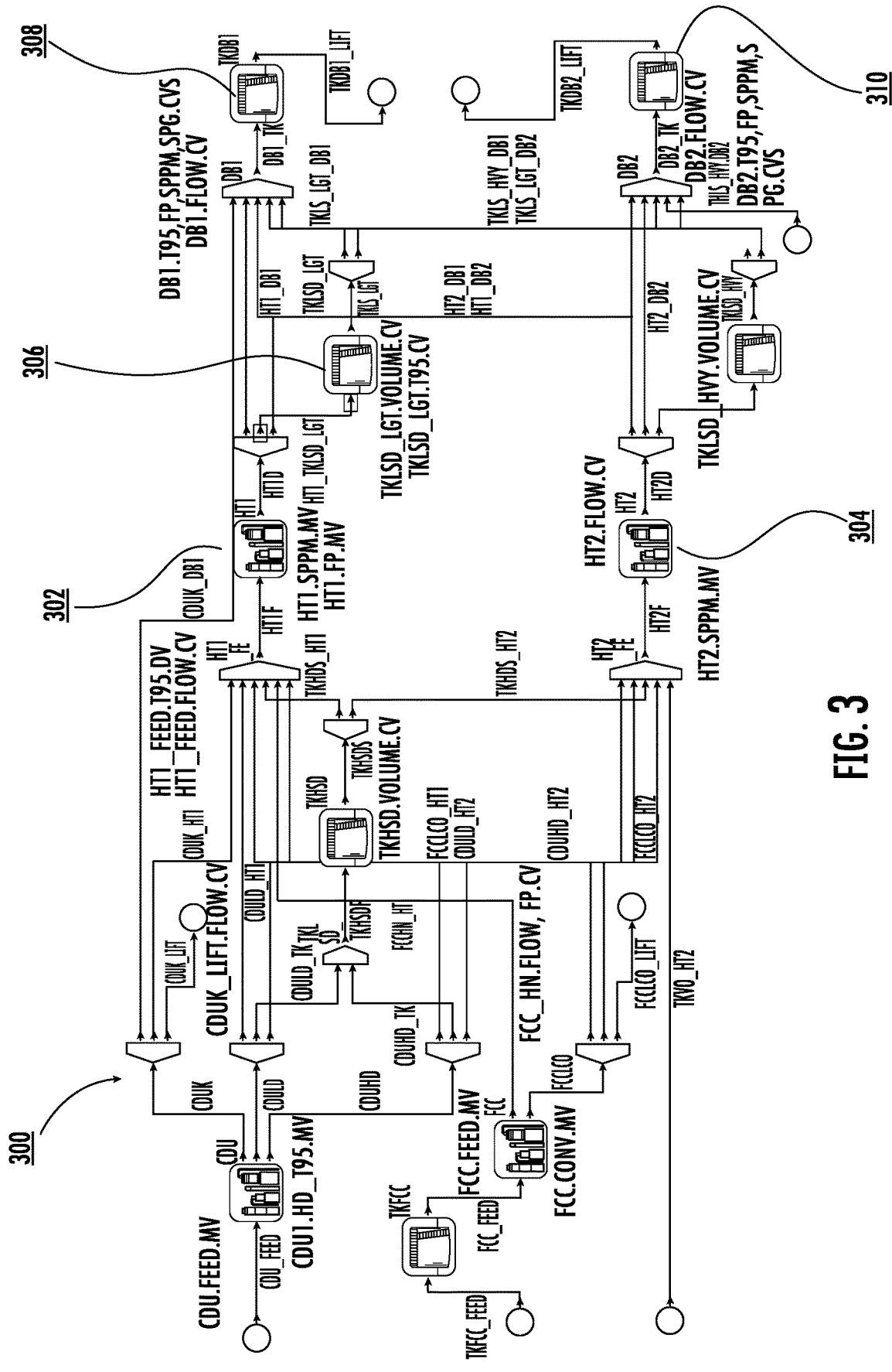

FIG. 3 illustrates a flowsheet model visualization of an example processing plant in accordance with at least one example embodiment of the present disclosure.

Figure 4:
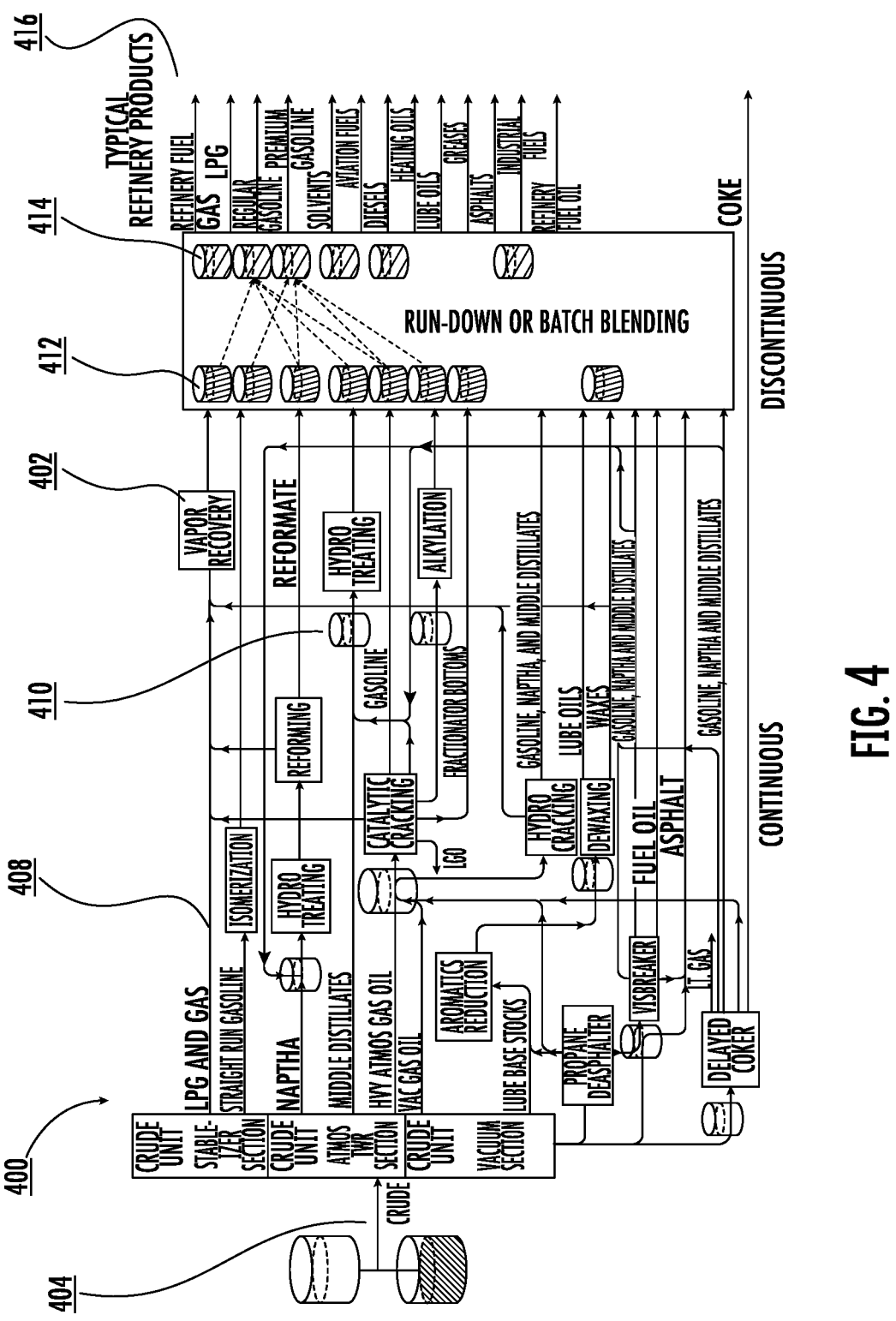

FIG. 4 illustrates a planning model visualization of an example processing plant in accordance with at least one example embodiment of the present disclosure.

Figure 5:
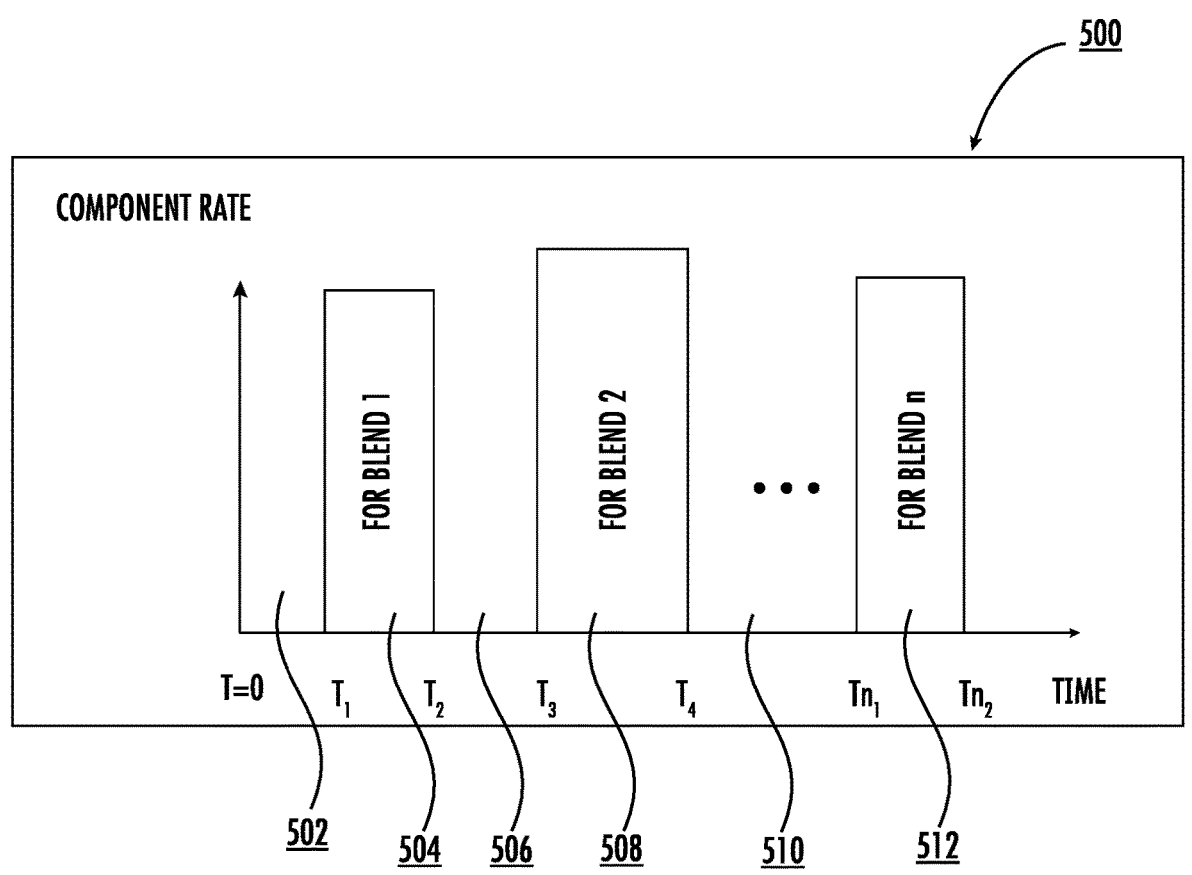

FIG. 5 illustrates a visualization of a future operating condition schedule in accordance with at least one example embodiment of the present disclosure.

Figure 6:
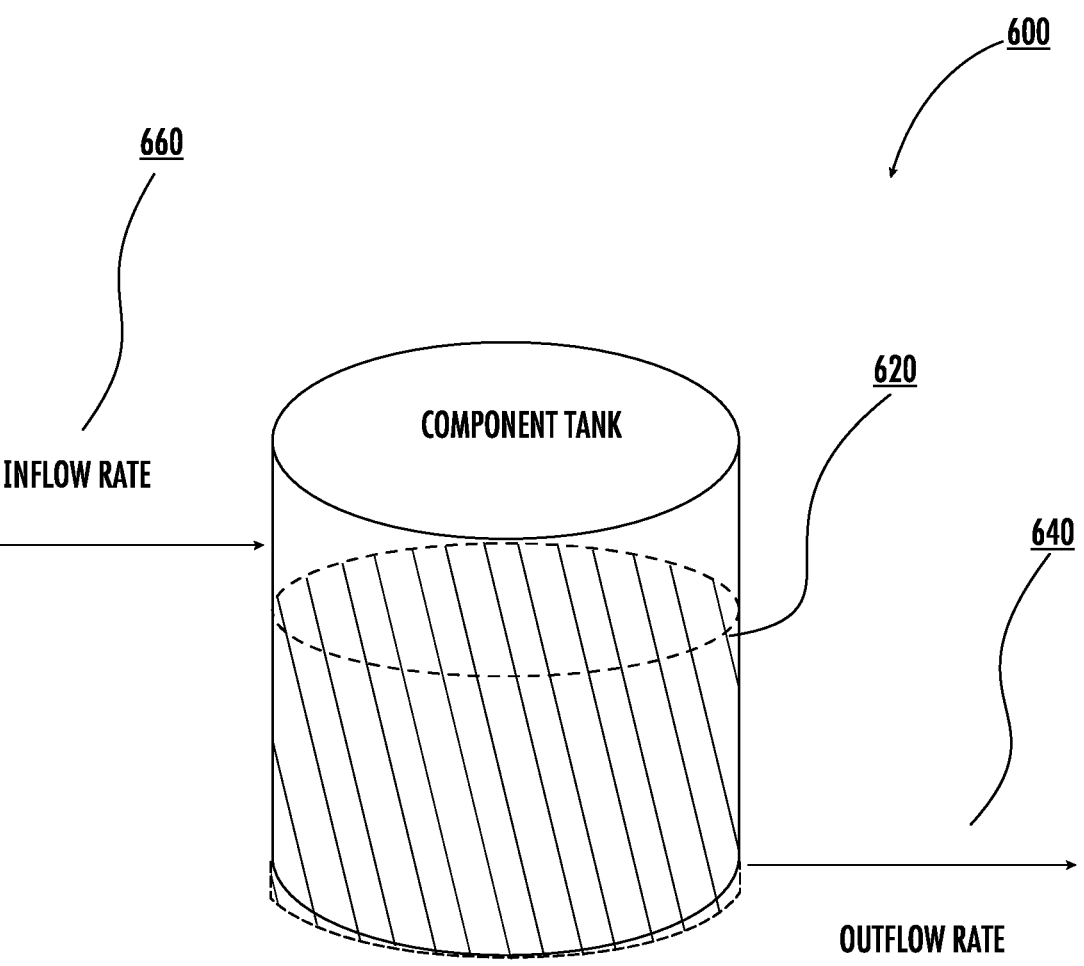

FIG. 6 illustrates a visualization of a product repository in accordance with at least one example embodiment of the present disclosure.

Figure 7:
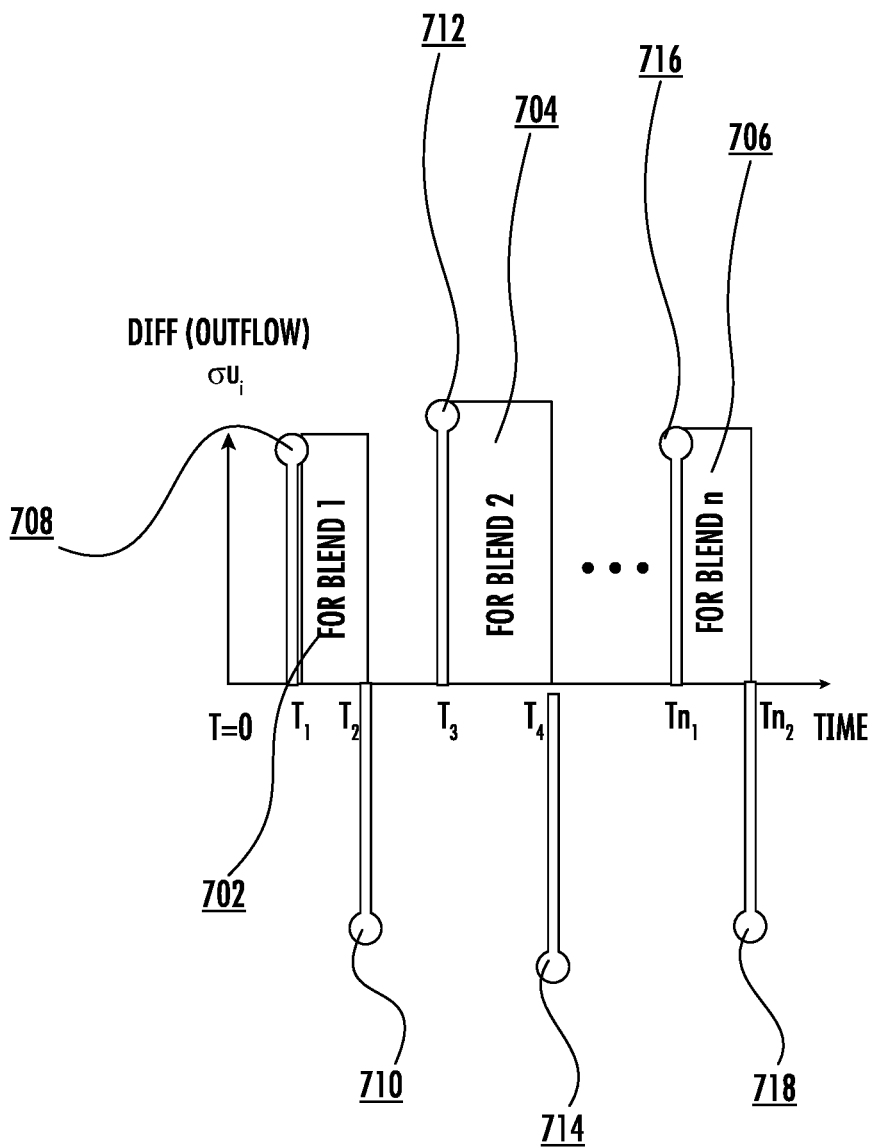

FIG. 7 illustrates a visualization of input pulses corresponding to a future operating condition schedule in accordance with at least one example embodiment of the present disclosure.

Figure 8A:
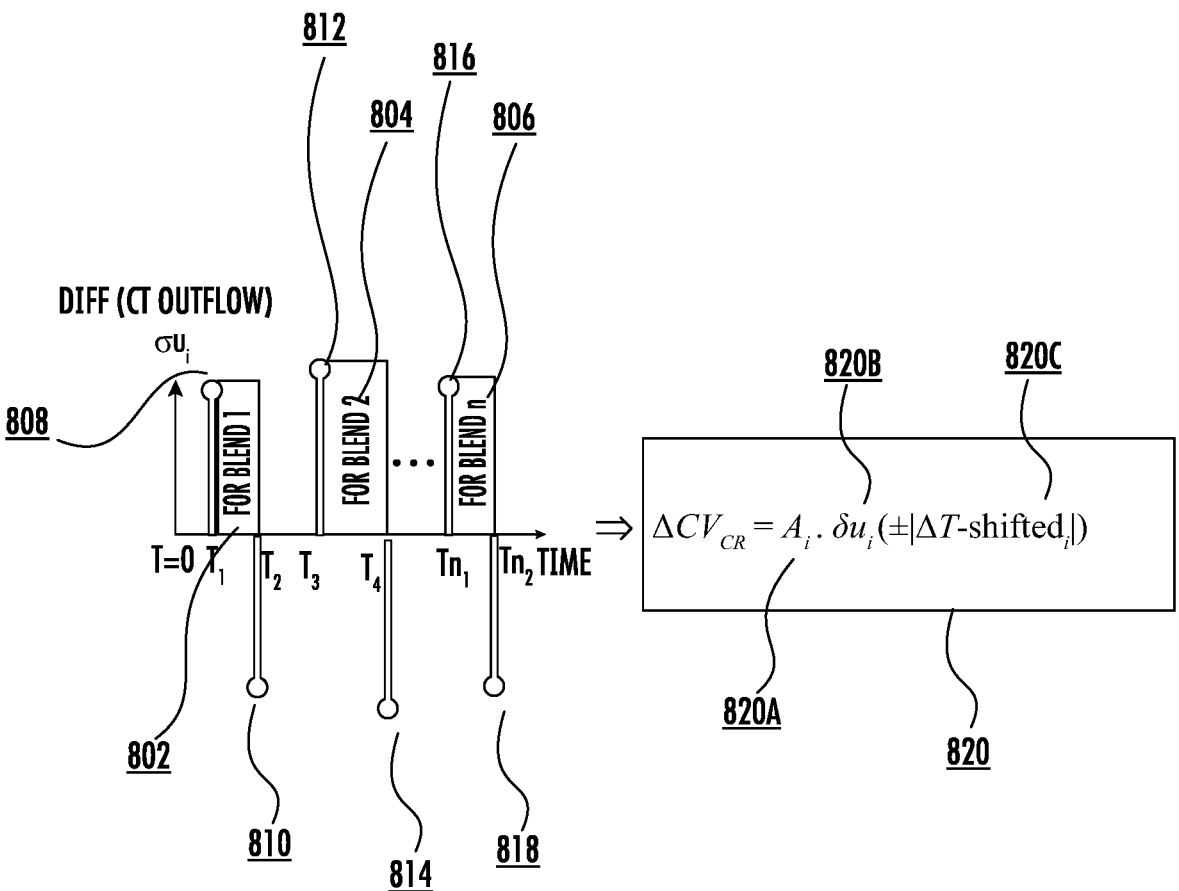

FIG. 8A illustrates a visualization of a corrective response model in accordance with at least one example embodiment of the present disclosure.

Figure 8B:
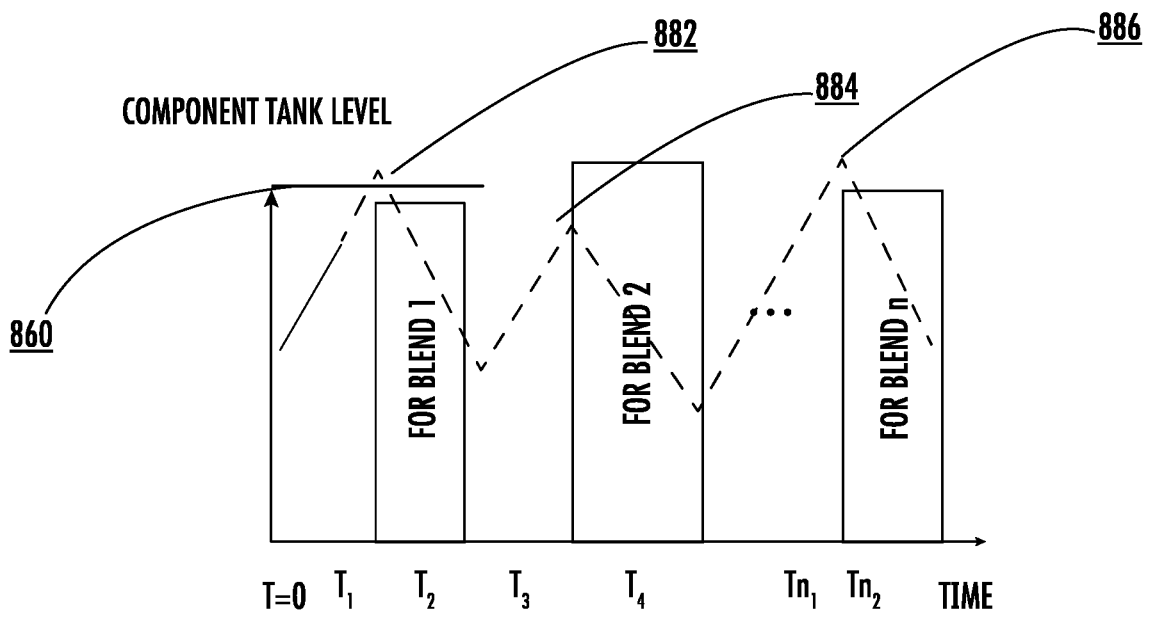

FIG. 8B illustrates a visualization of predicted data values for a constraint in accordance with at least one example embodiment of the present disclosure.

Figure 9B:
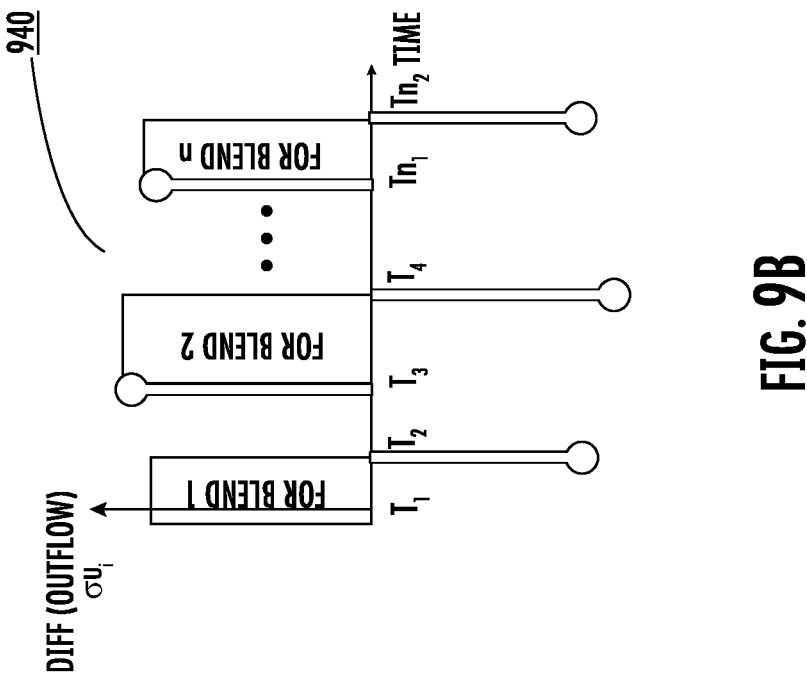
Figure 9A:
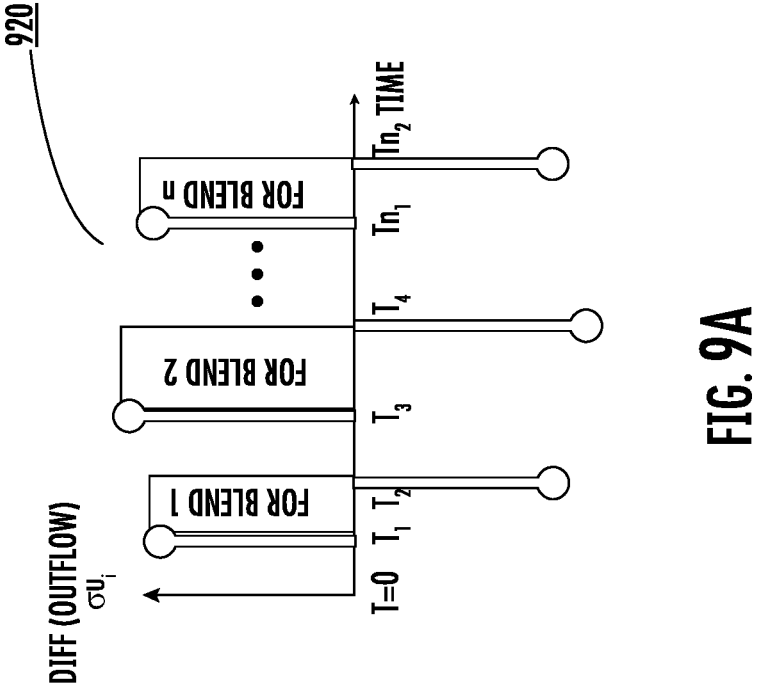

FIG. 9A illustrates a visualization of input pulses corresponding to a particular future operating condition schedule prior to a first timestamp in accordance with at least one example embodiment of the present disclosure.

FIG. 9B illustrates a visualization of input pulses corresponding to a particular future operating condition schedule subsequent to a first timestamp in accordance with at least one example embodiment of the present disclosure.

Figure 10:
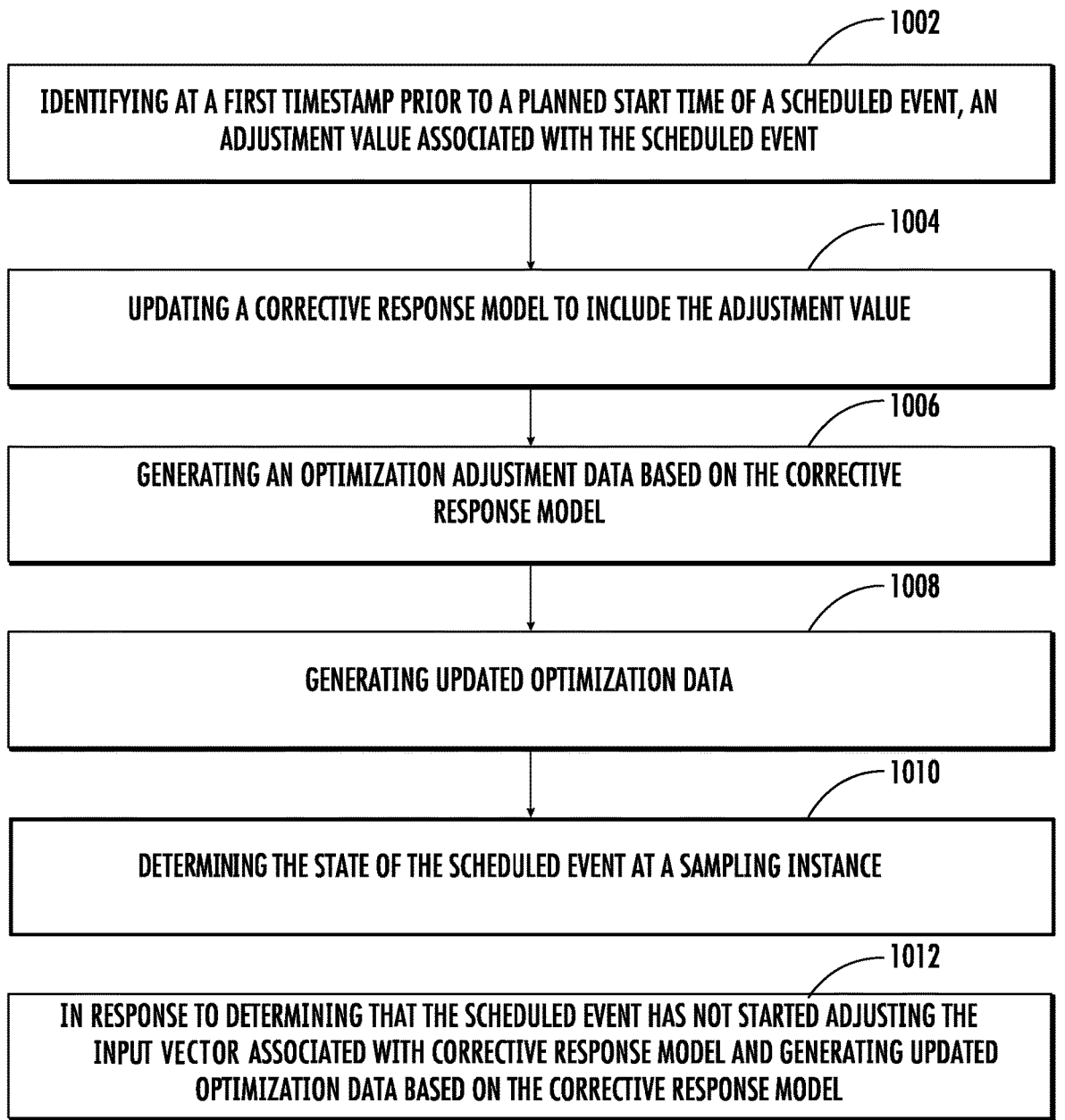

FIG. 10 illustrates flowchart including operations of an example process for improved process optimization in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements.

The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview

In various contexts, a processing plant operates to produce one or more products (intermediate product and/or final product) by performing any number of processing steps on input material(s). To this end, a processing plant may include any number of processing unit(s) that perform such processing step(s). In various contexts, one or more of such processing unit(s) is configured to operate in conjunction with one another to produce a particular product that represents an input material to one or more other processing units associated with a subsequent process, for example, a downstream process. In various contexts, the operation of the one or more of such processing unit(s) depends at least in part on the operation of the subsequent process. For example, inventory level of the input material produced or otherwise utilized by the one or more of such processing unit(s) may depend at least in part on the rate of flow of the stream of input material to the subsequent process. In one particular non-limiting example, the input material produced by the one or more of such processing unit(s) is stored in one or more product repository(s) for access by the downstream processing unit where, each product repository is associated with an upper inventory level limit and/or a lower inventory level limit. In various embodiments, it is desired to optimize the operation of the processing unit(s) such that the inventory level associated with a particular product and/or a particular product repository is within defined inventory level limits (e.g., upper inventory level limit and/or lower level inventory limit). Such limits may be defined to prevent overflow or underflow of a particular product during operation of one or more processing units.

In various contexts, a plant-wide optimization process is utilized to generate optimized data for operating processing units of a particular processing plant. In such contexts, the plant-wide optimization process often relies on a model predictive control (MPC) architecture utilized as the foundation of the plant-wide optimization process. In this regard, the underlying control scheme utilized for one or more processing unit(s) (e.g., an MPC architecture) may not be changeable, however underlying assumptions associated with the control scheme may cause problems for the plant-wide optimization process in circumstances where, for example, a discontinuous processing operation is considered. For example, plant-wide optimization based at least in part on the underlying control scheme relies on a default assumption that future operating condition of a processing unit, such as product inventory outflow, will be constant over the entirety of the timestamp interval to be optimized. When operation of a discontinuous process, for example, occurs, the plant-wide optimization often fails to account for uncertain scheduled disturbances that can lead to the prediction errors. For example, where a plant-wide optimization fails to take into account the possibility of a scheduled downstream processing event failing to start at the planned start time, predicted values for one or more particular constraints over a future timestamp interval may be inaccurate, which may lead to violation of the particular constraints.

Embodiments of the present disclosure generate optimization data that accounts and allows for variability in future operating condition and/or uncertain scheduled disturbances by utilizing operating condition data represented in a future operating condition schedule to generate optimization adjustment data (e.g., representing corrective response value(s)) to offset initial optimization data generated based on the default assumptions. In this regard, embodiments of the present disclosure provide for the ability to optimize operation of processing units associated with a continuous process, as well processing units associated with a discontinuous process without violating the default assumptions of an associated underlying architecture or other control scheme controlling the processing units (e.g., an MPC architecture).

Embodiments of the present disclosure utilize a corrective response model that incorporates a constraint failsafe parameter to generate optimization adjustment data that accounts for uncertainty with respect to the start time of scheduled event(s) associated with a processing unit. In some embodiments, the failsafe parameter corresponds to an adjustment value associated with a given scheduled event based on the operating mode associated with the given scheduled event. In some embodiments, the adjustment value associated with a given scheduled event reflects or otherwise represents a predicted possible worst scenario of starting the given scheduled event at a start time that differs from the planned start time. In this regard, embodiments of the present disclosure provides for the ability to generate optimization data that embodies a failsafe against uncertain scheduled disturbances with respect to one or more constraints associated with a processing unit(s) and/or processing plant.

Definitions

"Initial optimization data" refers to electronically managed data representing the output of an underlying control scheme of an optimization process based on default assumption(s). In some embodiments, the default assumption(s) is associated with a dynamic control scheme, for example an MPC architecture. In some embodiments, the default assumption represents that future operating condition, for example future inventory outflow, will be constant over a time window for which optimization is performed.

"Optimization adjustment data" refers to electronically managed data representing corrective response(s) for an initial optimization data generated based at least in part on default assumptions. In some embodiments, optimization adjustment data is generated based at least in part on operating condition data associated with one or more scheduled events of a downstream process.

"Adjustment value" refers to electronically managed data representing predicted possible worst scenario of starting a scheduled event at a predicted possible start time that differs from the planned start time. In some embodiments, an adjustment value is leveraged by a corrective response model to generate optimization adjustment data that reflects a failsafe against uncertain scheduled disturbances with respect to one or more constraints.

"Updated optimization data" refers to electronically managed data representing initial optimization data modified based at least in part on optimization adjustment data corresponding to one or more scheduled events.

"Outflow rate" refers to a rate of flow of a product from one environment to another environment at given instance. A non-limiting example of outflow rate is the rate of flow of an input product from a product repository storing the input product to a subsequent process.

"Operating mode" refers to a mode of operation for a particular processing unit, where the operating mode impacts inventory outflow rate associated with one or more processing units and/or processing plat. For example, in some embodiments, the mode of operating for a particular processing unit impact the outflow rate of a product repository supplying input product being input to a particular processing unit.

"Scheduled event" refers to a planned processing operation. In some embodiments, a scheduled event is associated with a downstream process that receives input product from upstream process comprising one or more processing units. In some embodiments, a scheduled event includes a discontinuous process. A non-limiting example of a scheduled event is a blending operation. In some embodiments, a scheduled event is associated with or otherwise defined by a particular operating mode of one or more operating modes with respect to a processing unit associated with the scheduled event.

"Input pulse" refers to a value of a signal controlling at least one processing unit to initiate, terminate, or otherwise perform a scheduled event. In some embodiments, the value of an input pulse for a given scheduled event increases, based at least in part on associated operating mode, to a particular value corresponding to an operating condition at a timestamp when the scheduled event begins, and the input pulse decreases from the particular value corresponding to the operating condition at a second timestamp when performance of the scheduled even ceases.

"Event schedule" refers to a plurality of timestamp intervals during which a particular processing unit is scheduled to operate utilizing different parameter(s), configuration(s), and/or process(es), each representing a different operating mode.

"MPC architecture" refers to a computing environment embodied in hardware, software, firmware, and/or a combination thereof, that performs model predictive control (MPC).

"Operating condition data" refers to electronically managed data representing a value corresponding to an operational parameter of a processing unit representing particular operation of the processing unit at one or more particular timestamp(s) or during particular timestamp interval(s). A non-limiting example of operating condition data includes a value representing an inventory outflow rate.

"Optimization data" refers to data usable to control operation of one or more processing unit(s) of a processing plant in a manner that minimizes, maximizes, or otherwise optimizes a value of a desired target parameter. In some embodiments optimization data includes predicted values for one or more constraints.

"Processing plant" refers to a system of interconnected processing units that provides one or more input product(s) and, utilizing one or more transformations performed by one or more of the processing units, transforms the one or more input ingredient(s) into at least one intermediate product and/or at least one final product. Non-limiting examples of a processing plant include an oil refinery, a petrochemical plant, and a chemical processing plant.

"Processing unit" refers to any machine, system, component, or hardware within a processing plant that stores, routes, controls, processes, blends, or otherwise interacts with one or more ingredients. Non-limiting examples of a processing unit include a blender, a hydrocracker, a different crude units, an aromatics reduction unit, a visbreaker, a de-waxer, an isomerization unit, a hydrotreating unit, a vapor recovery unit, and an intermediary storage.

"Corrective response model" refers to one or more algorithmic, statistical, and/or machine learning model(s) that determines optimization adjustment data representing corrective responses for initial optimization data.

"Pulse input model" refers to one or more algorithmic, statistical, and/or machine learning model(s) that determines a pulse input value from a particular signal associated with operation of a processing unit.

"Pulse input value" refers to electronically managed data representing a value of a signal representing a pulse that operates a processing unit in a particular operating mode.

"Timestamp interval" refers to electronically managed data representing a length of time.

"Future operating condition schedule" refers to electronically managed data representing target operating condition data across one or more timestamp intervals. In some embodiments, a future operating condition schedule includes operating condition data for one or more timestamp intervals during which one or more future events associated with a downstream processing unit is planned.

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes a processing plant system 104 in communication with an optimization system 102. In some embodiments, the processing plant system 104 communicates with the optimization system 102 over one or more communications network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the processing plant system 104 includes some or all of the optimization system 102, such that an external communications network 106 is not required.

In some embodiments, the processing plant system 104 and the optimization system 102 are embodied in an on-premises system within or associated with the processing plant. In some such embodiments, the processing plant system 104 and the optimization system 102 are communicatively coupled via at least one wired connection. Alternatively or additionally, in some embodiments, the processing plant system 104 embodies or includes the optimization system 102, for example as a software component of a single enterprise terminal.

The processing plant system 104 includes any number of computing device(s), system(s), physical component(s), and/or the like, that facilitates producing of any number of products, for example utilizing particular configurations that cause processing of particular inputs available within the processing plant system 104. In some embodiments, the processing plant system 104 includes one or more physical component(s), connection(s) between physical component(s), and/or computing system(s) that control operation of each physical component therein. In one example context, the processing plant system 104 embodies a refinery plant, which includes physical component(s) embodying blender(s), product repository(s), and/or other component(s) that perform particular process(es) to alter properties of inputs to the component, crude flow unit(s), piping between such physical component(s), valve(s) controlling flow between the physical component(s), and/or the like. Additionally or alternatively, in some embodiments the processing plant system 104 includes one or more computing system(s) that are specially configured to operate the physical component(s) in a manner that produces one or more particular product(s) simultaneously. In some embodiments, a processing plant system 104 includes one or more computing device(s) and/or system(s) embodied in hardware, software, firmware, and/or a combination thereof, that configure and/or otherwise control operation of one or more physical component(s) in the processing plant. For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different processing plant system(s) may include different physical component(s), computing system(s), and/or the like. For example, different refinery plants may include different components, different number of components, different types of components, and/or the like, that cause the processing plant system to operate differently from other refinery plants. In some embodiments, a processing plant may include one or more continuous processing operations and/or one or more discontinuous processing operations. In some embodiments, a processing plant system may include physical components distributed across one or more sites. In one example, a processing plant system includes at least one processing unit at a first site that is associated with a continuous process and at least one processing unit at a second site that is associated with a discontinuous process.

The optimization system 102 includes one or more computing device(s) and/or system(s) embodied in hardware, software, firmware, and/or a combination thereof, that performs optimization process(es) associated with at least one processing unit based at least in part on a future operating condition schedule corresponding to an event schedule associated with a downstream process that processes a product produced at least in part utilizing the at least one processing unit. In some embodiments, the optimization system 102 includes one or more computing device(s) and/or system(s) embodied in hardware, software, firmware, and/or a combination thereof, that predicts and/or controls one or more constraints against uncertain scheduled disturbances, for example, against uncertainty associated with scheduled start time of a scheduled event. For example, in some embodiments, the optimization system 102 generates optimization data that incorporates or otherwise reflects a failsafe for one or more constraints, for example, a failsafe for inventory level of a particular product over the optimization time window. In some embodiments, the optimization system 102 includes one or more specially configured application server(s), database server(s), end user device(s), cloud computing system(s), and/or the like. Additionally or alternatively, in some embodiments, the optimization system 102 includes one or more client devices, user devices, and/or the like, that enables access to functionality provided via the optimization system 102, for example via a web application, native application, and/or the like.

In some embodiments, the optimization system 102 is configured to perform an optimization process based on default assumption(s) associated with a particular dynamic control scheme (e.g., an MPC architecture) and based on optimization adjustment data. For example, in some embodiments, the optimization system 102 generates optimization data by adjusting default optimization data based at least in part on optimization adjustment data representing corrective response(s) for the default optimization data. In some embodiments, the optimization system 102 is configured to generate the optimization adjustment data based at least in part on future operating condition data corresponding to one or more scheduled events associated with a downstream process. In some embodiments, the optimization system 102 is configured to generate and leverage optimization adjustment data that accounts for or otherwise incorporates a possible worst scenario of starting a scheduled event associated with a downstream process at a start time that differs from the planned start time. For example, in some embodiments, the optimization system 102 is configured to generate optimization adjustment data corresponding to a particular scheduled event based at least in part on an adjustment value defined based at least in part on a worst scenario of performing the scheduled event at a start time that differs from the planned start time.

In some embodiments, the optimization system 102 and/or processing plant system 104 communicate with one another to perform the various actions described herein. For example, in some embodiments, the optimization system 102 and the processing plant system 104 communicate to generate optimization adjustment data to offset initial optimization data that is generated based at least in part on default assumptions associated with the control scheme (e.g., the underlying MPC architecture). For example, in some embodiments, the optimization system 102 and the processing plant system 104 communicate to generate and/or retrieve adjustment value(s) for each of one or more scheduled events. Additionally or alternatively, in some embodiments, the optimization system 102 and the processing plant system 104 communicate to facilitate control of the processing plant based at least in part on the generated optimization data.

For example, in some embodiments the optimization system 102 and the processing plant system 104 communicate to configure one or more physical component(s) of the processing plant to produce particular product(s) based at least in part on the optimization data.

FIG. 2 illustrates a block diagram of an example apparatus that may be specially configured in accordance with at least one example embodiment of the present disclosure. Specifically, FIG. 2 depicts an example optimization apparatus 200 ("apparatus 200") specially configured in accordance with at least some example embodiments of the present disclosure. In some embodiments, the optimization system 102 and/or a portion thereof is embodied by one or more system(s), such as the apparatus 200 as depicted and described in FIG. 2. The apparatus 200 includes processor 202, memory 204, input/output circuitry 206, communications circuitry 208, model management circuitry 210, operating condition management circuitry 212, optimization generation circuitry 214, and/or routing and control circuitry 216. In some embodiments, the apparatus 200 is configured, using one or more of the sets of circuitry embodied by processor 202, memory 204, input/output circuitry 206, communications circuitry 208, model management circuitry 210, operating condition management circuitry 212, optimization generation circuitry 214, and/or routing and control circuitry 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly.

Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with performing improved optimization associated with a corresponding dynamic control scheme (e.g., an MPC architecture). In some such embodiments, the processor 202 is configured to generate, receive, and/or store an adjustment value for each of one or more operating modes associated with a processing unit. In some embodiments, the processor 202 includes hardware, software, firmware, and/or a combination thereof, that generates and/or retrieves an adjustment value corresponding to a scheduled event at a first time stamp prior to planned start time of the scheduled event. In some embodiments, the adjustment value represents or otherwise is defined based on predicted possible worst scenario of starting the scheduled event at a start time that differs from the planned start time. In some embodiments, the adjustment value corresponding to a particular scheduled event is generated based at least in part on historical operating data for the particular scheduled event, where the historical operating data comprises or otherwise reflects historical planned start time and/or corresponding historical actual start time for the particular scheduled event. For example, in some embodiments, the adjustment value corresponds to the average delay of the start time of a scheduled event, where the average delay of the start time is determined based at least in part on historical operating data. As another example, in some embodiments, the adjustment value corresponds to the highest delay of the start time of a scheduled event, where the average delay of the start time is determined based at least in part on historical operating data. In some embodiments, the historical operating data comprise the average delay of the start time of a scheduled event. In some embodiments, the historical operating data comprise the highest delay of the start time of a scheduled event. It should be understood, however, that the adjustment value may comprise any value corresponding to the desired fail-safe. Additionally or alternatively, in some embodiments, the processor 202 includes hardware, software, firmware, and/or a combination thereof, that generates optimization adjustment data for each of one or more scheduled events by updating a corrective response model to include or otherwise reflect the respective adjustment value for the scheduled event. Additionally or alternatively, in some embodiments, the processor 202 includes hardware, software, firmware, and/or a combination thereof, that generates optimization adjustment data for each of one or more scheduled events by updating a corrective response model to exclude the adjustment value for the respective scheduled event. Additionally or alternatively, in some embodiments, the processor 202 includes hardware, software, firmware, and/or a combination thereof, that generates updated optimization data by applying optimization adjustment data to offset initial optimization data. Additionally or alternatively, in some embodiments, the processor 202 includes hardware, software, firmware, and/or a combination thereof, that stores, outputs, and/or further processes updated optimization data.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like.

In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch (es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes model management circuitry 210. The model management circuitry 210 includes hardware, software, firmware, and/or a combination thereof, that supports generation, maintenance, and/or use of a corrective response model. In some embodiments, the corrective response model embodies a step response model matrix. Additionally or alternatively, in some embodiments, the corrective response model embodies a pulse input signal. Additionally or alternatively, in some embodiments, the corrective response model embodies a constraint failsafe parameter. For example, in some embodiments, the model management circuitry 210 includes hardware, software, firmware, and/or a combination thereof, that retrieves a corrective response model corresponding to a scheduled event. In some embodiments, the model management circuitry 210 identifies a corrective response model (e.g., by retrieving or generating the corrective response model). The corrective response model, for example, may be generated utilizing any of a number of known methodologies. In some embodiments, model management circuitry 210 includes a separate processor, specially configured field programmable gate array (FPGA), or a specially programmed application specific integrated circuit (ASIC).

In some embodiments, the apparatus 200 includes operating condition management circuitry 212. The operating condition management circuitry 212 includes hardware, software, firmware, and/or a combination thereof, that supports identifying operating condition data corresponding to an event schedule associated with a downstream process, such as for example, a discontinuous processing configured to perform one or more processing operations defined based at least in part on the processing duration and/or product consumption rate. For example, in some embodiments, the operating condition management circuitry 212 includes hardware, software, firmware, and/or a combination thereof, that identifies, retrieves, receives, and/or generates a future operating condition schedule corresponding to a downstream process configured to receive at least one product from a product repository associated with one or more processing units of an upstream process. Additionally or alternatively, in some embodiments, the operating condition management circuitry 212 includes hardware, software, firmware, and/or a combination thereof, that identifies, retrieves, receives, and/or generates operating condition data, such as processing operation start time, processing operation stop time, flow rate, and/or other operating condition data corresponding to a particular timestamp interval. In some embodiments, the operating condition management circuitry 212 includes hardware, software, firmware, and/or a combination thereof, that identifies operating condition data associated with a processing unit based at least in part on input pulse(s) derived from a future operating condition schedule for one or more scheduled events. For example, in some embodiments, the operating condition management circuitry 212 is configured to identify planned start time and/or planned end time for each of one or more scheduled event associated with a particular processing unit over a time window based at least in part on input pulse(s) derived from future operating condition schedule for the one or more scheduled events. A timestamp interval in some embodiments may represent a planned processing duration for a first scheduled event, for example, a first processing operation, on an event schedule. A timestamp interval, in some embodiments, may be defined based at least in part on a start time and an end time of a corresponding scheduled event. In some embodiments, operating condition management circuitry 212 includes a separate processor, specially configured field programmable gate array (FPGA), or a specially programmed application specific integrated circuit (ASIC).

In some embodiments, the apparatus 200 includes optimization generation circuitry 214. The optimization generation circuitry 214 includes hardware, software, firmware, and/or a combination thereof, that supports generation of optimization data associated with one or more processing units and/or a processing plant. For example, in some embodiments, the optimization generation circuitry 214 includes hardware, software, firmware, and/or a combination thereof, that generates initial optimization data corresponding to default optimization data generated based at least in part on default assumptions. In some embodiments, the initial optimization data is generated based at least in part on default assumptions associated with optimization in the dynamic control scheme. Additionally or alternatively, in some embodiments, the optimization generation circuitry 214 includes hardware, software, firmware, and/or a combination thereof, that generates updated optimization data based at least in part on optimization adjustment data corresponding to one or more scheduled events, where, for example, the optimization adjustment data is applied to offset the initial optimization data. In some such embodiments, the updated optimization data may reflect or otherwise account for a possible worst scenario of starting an event, for example operating a processing operation, at a start time that differs from the planned start time. In some embodiments, the optimization generation circuitry 214 includes a separate processor, specially configured field programmable gate array (FPGA), or a specially programmed application specific integrated circuit (ASIC).

In some embodiments, the apparatus 200 includes routing and control circuitry 216. The routing and control circuitry 216 includes hardware, software, firmware, and/or any combination thereof, that informs controlling of one or more processing unit(s) based at least in part on optimization data. For example, in some embodiments, the routing and control circuitry 216 includes hardware, software, firmware, and/or any combination thereof, that causes operation of a physical component embodying a processing unit based at least in part on the optimization data. In some such embodiments, the routing and control circuitry 216 initiates or output commands or instructions for controlling the processing unit, or a plurality of processing units of a processing plant, in a manner that operates the processing unit(s) in a manner that optimizes one or more target parameter(s) (e.g., profit, emissions, efficiency, and/or the like). In some embodiments, the routing and control circuitry 216 configures one or more processing unit(s), for example to route particular ingredient(s), amount(s) of ingredient(s), and/or the like, in a manner determined to be optimized based at least in part on the optimization data. Additionally or alternatively, in some embodiments, the routing and control circuitry 216 includes hardware, software, firmware, and/or any combination thereof, that causes outputting of optimization data, for example adjusted optimization data, to one or more user interface(s) to enable a user to control operation of a processing unit, or multiple processing unit(s), in accordance with the optimization data. In some embodiments, routing and control circuitry 216 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, model management circuitry 210, operating condition management circuitry 212, optimization generation circuitry 214, and/or routing and control circuitry 216. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, model management circuitry 210, operating condition management circuitry 212, optimization generation circuitry 214, and/or routing and control circuitry 216, are combined into a single module embodied in hardware, software, firmware, and/or a combination thereof. Similarly, in some embodiments, one or more of the sets of circuitry, for example model management circuitry 210, operating condition management circuitry 212, optimization generation circuitry 214, and/or routing and control circuitry 216, is/are combined with the processor 202, such that the processor 202 performs one or more of the operations described above with respect to each of these sets of circuitry embodied by the model management circuitry 210, operating condition management circuitry 212, optimization generation circuitry 214, and/or routing and control circuitry 216.

Example Processing Plant Implementations and Representations

FIG. 3 illustrates a flowsheet model visualization of an example processing plant in accordance with at least one example embodiment of the present disclosure. Specifically, FIG. 3 depicts an example processing plant representation 300. The processing plant representation 300 depicts a layout and configuration of a particular processing plant, for example having one or more processing unit(s) that produce one or more products (e.g., intermediate product and/or final product) from one or more input material(s). As illustrated, the example processing plant is an oil refinery. It will be appreciated that in other embodiments, other processing plants may be utilized.

In some embodiments, the processing units depicted in the processing plant representation 300 source a particular product, utilize the product as input, and/or process incoming input materials in a particular manner. For example, as illustrated, the processing plant representation 300 may include representations corresponding to crude flow units, hydro treating processing units, reforming processing units, isomerization processing units, aromatics reduction processing units, and the like. Such processing units are depicted as connected via physical connections to one or more other upstream and/or downstream unit(s). Additionally or alternatively, in some embodiments, one or more processing units represented in the processing plant representation 300 include or is otherwise associated with one or more product repository(s), product source(s), and/or the like.

In some embodiments, one or more of the processing units represented in the processing plant representation 300 each flow to one or more other processing units of the processing plant and/or associated product repository during operation of the processing plant. In this regard, during operation of the processing plant and at a particular time slice, one or more of such processing units may be set to a particular configuration and operate in conjunction with one another to produce a particular target product, for example based at least in part on input material(s) received via the processing unit(s) represented by the representations 302-310. The processing plant may include one or more processing units that include a product repository(s) configured for storing a particular product for processing by one or more processing units associated with a downstream process. The one or more processing units associated with the downstream process may be configured to receive one or more product(s) from one or more product repository(s), and process the received products(s) based at least in part on an event schedule to output products (e.g., intermediate product and/or final product). In this regard, the product stored in a product repository and/or otherwise configured to be received by a processing unit associated with a downstream process may be referred to as a component. In some embodiments, the downstream process (e.g., processing unit(s) thereof that receive the product(s) from a component tank) may be external to the dynamic control scheme (e.g. MPC).

In some examples, the downstream process may comprise a continuous process and/or a discontinuous process. A non-limiting example of a discontinuous process is a blending process. For example and to provide context, in some embodiments, the processing plant may include or may be associated with one or more blender(s), for example corresponding to representations 308 and 310. The one or more blenders may be configured to receive one or more product(s) from a product repository, and process the products(s) based at least in part on an event schedule to output final product(s). In some embodiments, one or more blenders may be external to the processing plant (e.g., associated with a third-party), where the processing plant may be configured to provide one or more intermediate products, for example, blending components, to the external blender(s) for processing by the external blenders to output a final product. It should be appreciated that different processing plants may include any number, type, and/or configuration of different processing units, for example based at least in part on the products to be produced. Additionally, it should be appreciated that the above description of blenders and/or blending process are to provide context with respect to future processing of product(s) stored by a product repository and are not intended to be limiting.

As illustrated, the processing plant representation 300 includes a number of representations corresponding to various processing units of the depicted processing plant, including representations 302-310 representing various processing units of the processing plant. One or more of the processing units corresponding to the representations 302-310 may be configured to operate in any one of a plurality of different operating conditions. In one example, operating condition(s) of a processing unit may be adjusted based at least in part on the predicted value(s) for one or more constraint utilized in an optimization algorithm to generate optimization data for the processing unit and/or the processing plant. In one example, the one or more constraints includes the inventory level of a product repository associated with the processing unit. For example, the inventory level of a particular product repository may depend at least in part on the outflow rate of the product stored in the product repository, where the outflow rate may depend at least in part on an event schedule associated with the downstream process. In this regard, the inventory level of a particular product repository may be different at a first timestamp interval relative to a second timestamp interval (e.g., subsequent interval) based at least in part on an event schedule associated with the downstream process. It will be appreciated that in some embodiments, the different operating conditions may include other conditions. For example, in some embodiments, the different operating conditions may additionally and/or alternatively include one or more of receiving a different product as input, processing an input product in a different manner, initiating different process(es) performed by the processing unit, and/or the like, or any combination thereof.

In some embodiments, improved optimization is performed for one or more processing units by utilizing optimization adjustment data to adjust initial optimization data to generate adjusted optimization data for one or more processing units. In this regard, in some embodiments, optimization adjustment data represents corrective response value(s) for initial optimization data. In some embodiments, the adjusted optimization data accounts for uncertainty associated with one or more constraints associated with the one or more processing units or otherwise includes a failsafe for the one or more constraints. For example, in some embodiments the adjusted optimization data include predicted value(s) for one or more constraints, where the predicted value(s) reflect a failsafe corresponding to uncertainty associated with a start time of a scheduled event. For example, in some embodiments, the start time of a scheduled event may differ from the planned start time. In some embodiment, a scheduled event refers to a planned processing operation associated with associated with one or more processing units of a downstream process.

In some embodiments, each scheduled event is associated with or otherwise defined by a particular operating mode of one or more operating modes associated with the corresponding processing unit. For example, the adjusted optimization data may account for operating a processing unit associated with a downstream process at a start time that differs from the planned start time, where the processing unit associated with the downstream process receives one or more products from at least one product repository associated with one or more upstream processing units. In some embodiments, the optimization adjustment data is generated based at least in part on data associated with or otherwise derived from an event schedule, for example, operating condition data. As described above, in some embodiments, each scheduled event is associated with or otherwise defined by a particular operating mode of one or more operating modes. In this regard, each scheduled event may be associated with or otherwise defined by particular operating condition data based at least in part on the operating mode associated with the scheduled event.

In some embodiments, improved optimization is performable for a plurality of processing units in a plant-wide optimization. In this regard, individual optimization adjustment data (e.g., to apply to optimizations) may be performed for each of the processing units, resulting in a superposition of optimization adjustment data from each of such processing units. Based on the individual optimization adjustment data, adjusted optimization data for plant-wide optimization may be derived from the superposition of the individual optimization adjustment data. In this regard, it will be appreciated that the individual process of generating optimization adjustment data may be repeated for any number of processing units and applied to default plantwide optimization data that corresponds to the results of a default optimization scheme for purposes of optimizing the operations of the processing plant as a whole.

Specifically, in some embodiments, the adjusted optimization data generated as described herein represents corrective response prediction(s) associated with one or more processing units. The optimization adjustment data embodying a corrective response prediction then may be used by a default optimization procedure, such as in a plant-wide optimization scheme, an MPC optimization scheme, or another dynamic control scheme. Advantageously, use of such optimization adjustment data (e.g., representing corrective response values) enables only the response prediction to be corrected, and the remaining optimization scheme otherwise stays intact.

FIG. 4 illustrates a flowsheet model visualization of an example planning model in accordance with at least one example embodiment of the present disclosure. Specifically, FIG. 4 depicts an example planning model 400. The planning model 400 depicts one or more processing units(s) that generally operate to convert one or more input streams of input products into one or more output streams of processed products (e.g., intermediate product and/or final product). As illustrated, the example planning model 400 is an example oil refinery planning model. It will be appreciated that in other embodiments, other planning models may be utilized. In the example planning model 400, the processing units 402 denote physical components in an oil and gas refinery that convert a single input stream 404 (e.g., crude oil) into multiple output streams (e.g., one or more different refined oil/gas products). Various products 408 are created by the processing units 402. One or more product repository(s) may be used to store the various products 408.

In some embodiments, one or more product repository(s) may be associated with a continuous operation while one or more product repository may be associated with a discontinuous process. As depicted in FIG. 4, the example planning model 400 includes one or more product repository(s) 410 that feed one or more processing units of a continuous process. As further depicted in FIG. 4, the example planning model may include one or more product repository(s) 412 configured to feed one or more processing units of a discontinuous process, such as for example, a blending process configured to blend different products to form a refinery product. The example planning model 400 may include one or more product repository(s) 414 comprising the products being processed, and one or more output stream of processed products 416, for example, corresponding to final products.

In some contexts, uncertain scheduled disturbances, such as start time of a scheduled event can disrupt and/or otherwise cause the operation of one or more processing units and/or optimization scheme related to one or more processing units and/or processing plant to be performed in an inefficient manner with respect to operation of the processing plant. In some embodiments, the optimization system 102 is configured to generate adjusted optimization data for one or more processing units and/or a processing plant based at least in part on optimization adjustment data (e.g., representing corrective response value(s)) that incorporates adjustment value(s) that reflect a possible worst scenario of an uncertain scheduled disturbance. For example, in some embodiments, an adjustment value defined based on predicted possible worst scenario of operating a processing unit associated with a downstream process at a start time that differs from the planned start time is applied to a corrective response model configured to generate optimization adjustment data. In some embodiments, the optimization adjustment data is applied to offset an initial optimization data generated, for example, based at least in part on one or more default assumptions.

Example Visualizations of Operating Condition Data and Processing Thereof

FIG. 5 depicts an example visualization of a future operating condition schedule in accordance with at least one example embodiment of the present disclosure. Specifically FIG. 5 illustrates an example visualization of a future operating condition schedule generated based at least in part on the operating mode(s) corresponding to each of one or more scheduled events associated with a processing unit over an optimization time window, where at least one particular product utilized by the processing unit is produced by one or more other processing units (e.g., referred to herein as upstream processing units) and/or supplied from a product repository configured to store the at least one particular product. For example, the one or more upstream processing units may operate in conjunction with one another to produce the at least one product, where, in some embodiments, the at least on particular product is stored in a product repository.

In some embodiments, an optimization system, for example embodied by the apparatus 200, receives and/or generates the future operating condition schedule 500. In some embodiments, the future operating condition schedule 500 represents target operating condition data across one or more timestamp intervals. For example, in some embodiments, the future operating condition schedule 500 includes operating condition data for one or more timestamp intervals during which one or more future events associated with a processing unit is planned. In some embodiments, a future operating condition schedule includes one or more timestamp intervals, corresponding to one or more scheduled events configured to utilize at least one particular product produced by one or more processing units. For example, a first timestamp interval may correspond to a first scheduled event, a second timestamp interval may correspond to a second scheduled event, and a third timestamp interval may correspond to a third scheduled event. In some embodiments, each of the one or more scheduled events may be associated with particular operating condition data based at least in part on the operating mode associated with the respective scheduled event. In this regard, one or more timestamp intervals of an example future operating condition schedule may be associated with different operating condition data relative to one or more other timestamp intervals. In some embodiments, operating mode refers to a mode of operation for a particular processing unit. In one non-limiting example, the operating condition data associated with each timestamp interval comprises outflow rate of a product repository configure to store a particular product that is utilized during performance of the one or more scheduled events. In some embodiments, an operating mode associated with a scheduled event impacts the inventory level of a product utilized during performance of the scheduled event. For example, in some embodiments, an operating mode associate with a scheduled event impacts the outflow rate of a product repository storing a product being input into a downstream processing unit utilized during performance of the scheduled event. In some embodiments, a future operating condition schedule may correspond to an event schedule associated with a discontinuous process. For example, a particular future operating condition schedule in some embodiments, may be generated based at least in part on an event schedule for a discontinuous process. A non-limiting example of a discontinuous process is a blending process performed by an oil refinery.

In some embodiments, the apparatus 200 as depicted and described herein receives or otherwise generates one or more data object(s) embodying a future operating condition schedule 500 based on an event schedule. For example, the future operating condition schedule 500, in some embodiments, is received in response to user engagement with the apparatus 200, or a corresponding client device, where the user engagement defines, creates, uploads, or otherwise inputs the future operating condition schedule 500 for processing. For example, in some embodiments, the apparatus 200 receives user input embodying each portion of the future operating condition schedule 500, such as where the user input defines operating condition data for one or more timestamp intervals. In other embodiments, the future operating condition schedule is automatically generated and/or determined via one or more data-driven determination (e.g., a time-based schedule, a data-detected event, and/or the like). In some embodiments, the apparatus 200 retrieves the future operating condition schedule 500 from a data repository storing the one or more future operating condition schedules. In some embodiments, the future operating condition schedule 500 is received from an external system, such as for example, a third-party system.

As depicted, the future operating condition schedule 500 includes data corresponding to various timestamp intervals. The future operating condition schedule 500 depicts operating condition data corresponding to each timestamp interval $T_0$ through $T_{n2}$, with each number corresponding to a different timestamp interval. For example, the future operating condition schedule 500 includes operating condition data 502 corresponding to a first timestamp interval $T_0$ to $T_1$, operating condition data 504 corresponding to a second timestamp interval $T_1$ to $T_2$, operating condition data 506 corresponding to a third timestamp interval $T_2$ to $T_3$, operating condition data 508 corresponding to a fourth timestamp interval $T_3$ to $T_4$, operating condition data 510 corresponding to a fifth timestamp interval $T_4$ to $T_5$, and so on until operating condition data 512 corresponding to a timestamp interval $T_{n1}$ to $T_{n2}$.

The various operating condition data associated with the future operating condition schedule 500 includes operating condition data corresponding to one or more timestamp intervals, where each of the one or more timestamp intervals is associated with a particular scheduled event defined based on a corresponding operating mode. For example, in some embodiments, the operating condition data associated with the first timestamp interval may be different from the operating condition data associated with a second timestamp interval based at least in part on the operating modes for the particular scheduled events associated with the respective timestamp intervals. As illustrated, operating condition data 504 represents individual operating condition data for a first scheduled event, operating condition data 508 represent individual operating condition data for a second scheduled event, and operating condition data 512 represents individual operating condition data associated with nth scheduled event. In some embodiments, each scheduled event represents a scheduled processing operation. As illustrated in FIG. 5, in some embodiments, the future operating condition schedule 500 is associated with a discontinuous process, where one or more timestamp intervals (e.g., $T_0$ to $T_1$, $T_2$ to $T_3$, $T_4$ to $T_{n1}$) may correspond to a time interval where the processing unit configured to perform the one or more scheduled events is inactive with respect to performing a processing operation.

In some embodiments, each operating condition data associated with a particular timestamp interval includes a data value representing an inventory outflow rate of a particular product with respect to one or more processing units and/or product repository storing the particular product. As illustrated, the data value representing the outflow rate may correspond to the height of the corresponding operating condition data portion represented in the visualization in FIG. 5. Additionally or alternatively, in some embodiments, each operating condition data includes one or more data value(s) representing a timestamp interval (e.g., a start timestamp and an end timestamp, a start timestamp and a duration, and/or the like). As illustrated, the data value(s) representing the timestamp interval corresponds to the width of the corresponding operating condition data portion represented in the visualization in FIG. 5.

FIG. 6 depicts an example visualization of a product repository. Specifically, FIG. 6 depicts an operational example of a product repository 600 configured to store a particular product, where a processing unit associated with one more scheduled event may retrieve a stream of the particular product at one or more timestamp intervals based at least in part on the scheduled events. The product repository may be associated with one or more processing units configured to operate in conjunction with one another to output a stream of the particular product into the product repository. In this regard, the inventory level 620 of the product repository 600 over a particular timestamp interval may depend at least in part on the outflow rate 640 of the product repository 600 during the timestamp interval and/or the inflow rate 660 of the product repository 600 during the particular timestamp interval. For example, in an example context where the outflow rate 640 is greater than the inflow rate 660 during the particular timestamp interval, the inventory level 620 of the product repository 600 may reduce over the particular timestamp interval. As another example, in an example context where the outflow rate 640 is less that the inflow rate during the particular timestamp interval, the inventory level 620 of the product repository 600 may increase over the particular timestamp interval. In this regard, in some embodiments, the inventory level of a product repository may represent a constraint in an optimization algorithm leveraged by a control scheme to optimize the operation of the one or more processing units and/or processing plant.

In some embodiments, the apparatus 200 processes the future operating condition schedule 500 as described herein to predict data values for one or more constraints over a time window for which optimization is performed. As described above, in some embodiments, the one or more constraints includes inventory level of a particular product. In some embodiments, the apparatus 200 generates optimization data utilizing a default optimization process, for example an optimization process configured based at least in part on one or more default assumptions. The default assumption(s), for example, may be associated with a dynamic control scheme, such as an MPC architecture. In some embodiments, the default assumption represents that future operating condition, such as future outflow of a product will be constant (e.g., substantially constant) over a time window for which optimization is performed. In various contexts, such as when the future operating condition of a process is not intended to remain constant, for example discontinuous process, default optimization data generated based on the default assumptions may thus include inaccurate data. Accordingly, embodiments of the present disclosure generate optimization data that accounts and allows for variability in future operating condition by utilizing the operating condition data represented in a future operating condition schedule, such as future operating condition schedule 500 to generate optimization adjustment data (e.g., representing or otherwise comprising corrective response value(s)) that offset initial optimization data generated based on the default assumptions. In this regard, such embodiments provide for the ability to optimize operation of process units associated with a continuous process, as well as process units associated with a discontinuous process units without violating the default assumptions of an associated underlying architecture or other control scheme controlling the processing units (e.g., an MPC architecture). Visualizations of the component data portion(s) of data and corresponding process for generation of the optimization adjustment data are further described herein.

FIG. 7 illustrates a visualization of input pulses corresponding to a future operating condition schedule, such as future operating condition schedule 500. In this regard, in such some embodiments, the input pulses correspond to operating mode(s) of the one or more schedule events associated with the future operating condition schedule. In some embodiments, the apparatus 200 generates optimization adjustment data for each timestamp interval using a corrective response model that leverages the input pulses corresponding to the operating condition data associated with the respective timestamp interval. For example, in some embodiments, the apparatus 200 is configured to generate an input pulse schedule based on a future operating condition schedule.

FIG. 7 particularly depicts input pluses corresponding to data of particular operating mode(s) associated with a future operating condition schedule. Specifically, the input pulses correspond to particular operating condition data for such operating mode. In some embodiments, the operating condition data represents particular data portions extracted from a particular inputted future operating condition schedule. FIG. 7 further depicts the data portions extracted or otherwise determined from the future operating condition schedule that embody the starting points and/or ending points from which input pulses corresponding to particular timestamp intervals are derivable.

As illustrated, FIG. 7 depicts various positive input pulses and negative input pulses, with a series of positive input pulse and then negative input pulse defining a portion of operating condition data corresponding to a timestamp interval. For example, as illustrated, a first operating condition data portion 702 corresponding to a first timestamp interval is defined by a first input pulse 708 and a second input pulse 710. In some such embodiments, the input pulse 708 represents a first data value that defines a beginning of the first operating condition data portion 702. The input pulse 708 is associated with a timestamp $T_1$, where the first operating condition data portion 702 begins. As illustrated, the input pulse 708 represents a positive value, for example indicating a change from no input signal to an input signal of a particular value representing the differential of the outflow rate associated with the corresponding product repository. Similarly, in some embodiments, the input pulse 710 represents a second data value that defines an end of the first operating condition data portion 702. The input pulse 710 is associated with a timestamp T2, where the first operating condition data portion 702 ends. In this regard, the first operating condition data portion 702 is defined by the timestamp interval between the input pulse 708 and the input pulse 710, for example, $T_1$ to T2. As illustrated, the input pulse 710 represents a negative value, for example indicating a change from an input signal of a particular value corresponding to the outflow rate back to no input signal. In this regard, a positive input pulse may indicate a beginning of a particular event, such as for example a processing operation, and a negative input pulse may indicate an end of a particular event.

The apparatus 200, in some embodiments, processes any number of input pulse(s) to identify and/or generate various portion(s) of operating condition data for a particular timestamp interval. For example, as illustrated in FIG. 7, a second data portion embodying a second operating condition data portion 704 corresponding to a second time interval is defined by a first input pulse 712 and a second input pulse 714. The second operating condition data portion 704 is defined between two timestamps associated with the input pulses 712 and 714, specifically defining the timestamp interval T3 to T4. Additionally, a third data portion embodying a third operating condition data portion 706 corresponding to a third timestamp interval is defined by a first input pulse 716 and a second input pulse 718. The third operating condition data portion 706 is defined between two timestamps associated with the input pulses 716 and 718, specifically defining the timestamp interval $Tn_1$ to $Tn_2$. In this regard, it will be appreciated that the apparatus 200 may utilize input pulses to define any number of data portions of future operating condition data associated with a particular product repository and/or other processing units.

In some embodiments, the apparatus 200 generates the input pulses by applying a difference operator on the data portions of the future operating condition schedule. In one example context, for example a discretized system, the future operating condition schedule may be represented by a vector or other series of numerical values, where their position in the series represents the discretized timestamp of the portion of the future operating condition schedule. The difference operator in some embodiments embodies a mathematical formula, operation, or other process that takes a current value of an input signal series (e.g., the vector representing the future operating condition schedule 500) minus a previous value in the input signal series. In this regard, the application of such difference operators enables derivation of the input pulse(s) of FIG. 7 from a particular corresponding future operating condition schedule, for example, the future operating condition schedule 500. The schedule of input pulses then defines a particular input vector δu, for example, as utilized in the corrective response model and/or other models described herein. In some embodiments, the vector $\delta u_i$ is equivalent to the unit height of the switching signal, for example, embodying an input pulse.

In some embodiments, the apparatus 200 determines a pulse input value corresponding to a particular input pulse utilizing a pulse input model. In some embodiments, the pulse input model detect(s) and/or process(es) input signal(s) embodying the input pulse to determine the corresponding input pulse value based at least in part on the input signal(s). In some embodiments, the apparatus 200 maintains the pulse input model for use with such input signal(s) embodying an input pulse. In some embodiments, the pulse input model comprises a different operator formula that successively produces an output series of input pulse values (e.g., as a vector or the like) based on differences between a current value in a data series embodying a future operating condition schedule and a previous value in the data series embodying the future operating condition schedule. In some embodiments, a corrective response model configured to generate corrective response values may embody the pulse input model. In some embodiments, the pulse input model may be separate from the corrective response model.

In some embodiments, one or more constraints associated with one or more processing units and/or processing plant depends at least in part on the operating condition data portions and corresponding timestamp intervals of a future operating condition schedule. In some embodiments, for example, the one or more constraints include inventory level of a particular product, where the particular product may be stored in a product repository and where the inventory level may be associated with one or more inventory limit thresholds (e.g., upper limit threshold, lower limit threshold, etc.). In some embodiments, a product repository storing the particular product is associated with one or more limit thresholds (e.g., upper limit threshold, lower limit threshold, etc.). In some contexts, one or more operating condition data portions associated with a future operating condition schedule may shift (e.g., forward or backward) with respect to the time window for which optimization is performed. For example, in some contexts, the start time for a particular scheduled event may differ from the planned start time for the particular event, which shifts the operating data portion associated with the particular scheduled event. The start time for a particular scheduled event may differ from the planned start time for a myriad of reasons, for example, based at least in part on equipment breakdown, disruption in a preceding event, and/or the like. In this regard, embodiments of the present disclosure generate optimization adjustment data for each of one or more timestamp intervals using a corrective response model that incorporates a constraint failsafe parameter corresponding to an adjustment value, where the optimization adjustment data accounts for uncertainty with respect to the start time of scheduled event(s). For example, in some embodiments, adjustment value associated with each scheduled event is configured to reflect or otherwise comprise possible worst scenario of starting the respective scheduled event at a start time that differs from the planned start time. In this regard, the corrective response model provides for the ability to generate optimization data that embodies a failsafe with regard to one or more constraints, such as for example, product inventory level.

FIG. 8A illustrates a visualization of a corrective response model 820 incorporating a constraint failsafe parameter. Specifically FIG. 8A depicts a visualization of a corrective response model 820 that may be utilized to generate optimization adjustment data. In some embodiments, the optimization adjustment data corresponding to a particular timestamp interval associate with a particular scheduled event (e.g., "blend 1," "blend 2", "blend n" as depicted) is determinable based at least in part on the corrective response model 820. In this regard, optimization adjustment data may be generated for a particular scheduled event (i). In some embodiments, the corrective response model includes or is otherwise defined by a step response model matrix 820A (e.g., "$A_i$"), input vector 820B ("$\delta u_i$") (also referred to herein as input vector parameter), and/or a constraint failsafe parameter 820C (e.g., "$\Delta T\text{-shifted}_i$"). The subscript "i" represents a particular timestamp interval corresponding to a particular scheduled event (e.g., "blend 1," "blend 2", "blend n" as depicted). In some embodiments, the step response model matrix 820A may be dynamically generated or prebuilt and retrieved or otherwise maintained by the apparatus 200 for use.

As described above, in some embodiments, the input vector $\delta u_i$ is equivalent to the unit height of the switching signal, for example, embodying an input pulse. For example, the input vector $\delta u_i$ may represent timestep changes in the vector between timestamp intervals. In this regard, the vector $\delta u_i$ may change across the time window. In some embodiments, the input vector $\delta u_i$ is configured to be shifted forward or backward at a given sampling instance by an amount that corresponds to the value of the constraint failsafe parameter 820C. For example, in some embodiments, to determine an optimization adjustment data for a particular scheduled event that accounts for uncertainty associated with the start time for the particular scheduled event, the apparatus 200 sets the constraint failsafe parameter 820C to the adjustment value for the particular scheduled event at a timestamp prior to the planned start time for the particular scheduled event. The corrective response model may then be applied to generate optimization adjustment data for the particular scheduled event.

In some embodiments, applying the corrective response model to generate optimization adjustment data for a particular scheduled event includes shifting the input vector 820B forward or backward by an amount corresponding to the value of the constraint failsafe parameter, where in some embodiments as described above, the value of the constraint failsafe parameter at a timestamp prior to the planned start time for the particular event corresponds to the adjustment value. In this regard, shifting the input vector 820B forward or backward by an amount corresponding to the adjustment value corresponds to shifting the planned start time for the particular event forward or backward respectively by the corresponding adjustment value. The corrective response model 820 provides various advantages, including that in some embodiments only the input vector 820B needs to be shifted forward or backward in tandem with the plant-wide optimization execution (e.g., of a particular optimization process).

In some embodiments, the input vector 820B is shifted forward to provide a failsafe against violating the upper limit threshold of the corresponding constraint. Additionally or alternatively, in some embodiments, the input vector 820B is shifted backward to provide a failsafe against violating the lower limit threshold of the corresponding constraint. To provide context and as a non-limiting example, where the corrective action model is applied at time $T_0$ prior to the planned start time of the particular scheduled event, and where for example the adjustment value is one hour, the input vector 820B is shifted to $T_{0+1}$ (e.g., the optimization process will operate under the assumption that the planned start time for the particular event is at timestamp $T_{0+1}$) corresponding to a one hour forward shift. In this regard, the optimization process generates optimization data that accounts for the possibility of starting the particular scheduled event at a start time that differs from the planned start time by a one hour delay.

In some embodiments, the adjustment value for a given scheduled event may be generated or prebuilt and retrieved or otherwise maintained by the apparatus 200 for use with the particular scheduled event. In some embodiments, the adjustment value for a particular scheduled event may be determined based at least in part on historical operating data associated with the operating mode for the particular scheduled event, where the historical operating data comprises historical planned start time and corresponding historical actual time for the particular scheduled event.

In some embodiments, the apparatus 200 is configured to set the constraint failsafe parameter associated with a particular scheduled event to a zero value, when it is determined that the scheduled event has begun. Based at least in part on corrective response model 820 defined at least in part by the step response model matrix 820A, the input vector 820B, and/or the constraint failsafe parameter corresponding optimization adjustment data for a given timestamp interval may be generated utilizing the corrective response model 820. The resulting optimization adjustment data may be applied to initial optimization data (as described above) to generate optimization data that represents an accurate optimization data that accounts for variability in operating conditions and/or uncertainty associated with the start time of a scheduled event.

FIG. 8B illustrates a visualization of predicted data values for a particular constraint generated using a corrective response model as described herein. Specifically FIG. 8B illustrates a visualization of predicted values for a particular constraint that reflects a failsafe configured to prevent violation of the upper limit threshold of the constraint. In this regard at a time stamp prior to the planned start of any of the scheduled events, the planned start time for each scheduled event is shifted forward by an amount corresponding to the respective adjustment value for each scheduled event. The adjustment value may represent a tuning parameter that may be determined based at least in part on historical operating data (e.g., an average delay of the start time, a highest delay of the start time, and/or the like). FIG. 8B depicts data points 882, 884, 886 representing the highest predicted values for the constraint at each timestamp interval. As shown in FIG. 8, the data points 882 and 886 exceed the constraint upper limit 860. In this regard, the predicted values for the constraint indicate or otherwise highlight that if the scheduled events start at timestamp that corresponds to the worst possible scenario, for example, based on historical operating data, the constraint would be violated. In this regard, predictive action(s) may be taken to prevent such violation from occurring.

FIG. 9A illustrates a visualization of input pulses 920 corresponding to a particular future operating condition schedule prior to a first timestamp corresponding to the planned start time. In some embodiments, the apparatus 200 is configured to set the constraint failsafe parameter associated with a particular scheduled event to the corresponding adjustment value for the scheduled event prior to the first timestamp corresponding to the planned start time. The apparatus 200 may then generate optimization adjustment data corresponding to the schedule event(s) using the corrective response model incorporating the constraint failsafe parameter.

FIG. 9B illustrates a visualization of input pulses 940 corresponding to the particular future operating condition schedule subsequent to a first timestamp corresponding to the planned start time. As described above, the vector $\delta u_i$ may represent timestep changes in the vector between timestamp intervals. In this regard, the vector $\delta u_i$ may change across the time window. For example, the value of the vector $\delta u_i$ at timestamp interval $T_3$-$T_4$ may be different from the vector $\delta u_i$ at timestamp interval $T_1$-$T_2$. In some embodiments, the apparatus 200 is configured to shift the vector $\delta u_i$ by one sampling time while maintaining the adjustment value (e.g., $\Delta T$-shifted$_i$) value when it is determined that a scheduled event has not at the given sampled instance.

Example Processes of the Disclosure

Having described example systems and apparatuses, data visualizations, and formulas in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 10 illustrates a flowchart including operations of an example process for improved process optimization in accordance with at least one example embodiment of the present disclosure. Specifically, FIG. 10 depicts an example process 1000 for improved optimization that incorporates a failsafe for one or more constraint against uncertain scheduled disturbances. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1000 is described as performed by and from the perspective of the apparatus 200.

Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

According to some examples, the method includes identifying prior to a timestamp corresponding to a planned start time of a downstream processing unit associated with a scheduled event, an adjustment value at operation 1002. In some embodiments, identifying the adjustment value includes retrieving the adjustment value from a database. In some embodiments, the adjustment value is determined based at least in part on historical operating data. In some embodiments, the historical operating data comprises data that reflects the actual start of the particular operation relative to the planned start time over a period of time. In some embodiments, the adjustment value for the scheduled event represents or is otherwise defined based on predicted possible worst scenario of starting the event at a start time that differs from the planned start time.

According to some examples, the method includes updating a corrective response model to include the adjustment value at operation 1004. In some embodiments, the corrective response model comprises or otherwise is defined by a step response model matrix associated with the scheduled event, an input vector parameter, and a constraint failsafe parameter. In some embodiments, updating the corrective response model to include the adjustment value, comprises setting the constraint failsafe parameter to the adjustment value. In some embodiments, the apparatus 200 generates the corrective action model. In some embodiments, to generate the corrective action model, the apparatus 200 identifies and/or retrieves the step response model matrix associated with a particular operation.

In some embodiments, the apparatus 200 generates the input pulse parameter based at least in part on a future operating condition schedule associated with the scheduled event as described herein. In some embodiments, the apparatus 200 receives the future operating condition schedule in response to user engagement embodying input of the future operating condition schedule. Additionally or alternatively, in some embodiments, the apparatus 200 receives an upload or other indication of a file, data object(s), and/or the like embodying the future operating condition schedule. Additionally or alternatively, in some embodiments, the apparatus 200 determines and/or retrieves the future operating condition schedule automatically, for example at automated timestamps, in response to data-driven determination(s), and/or the like. In some embodiments, the future operating condition schedule is associated with a downstream processing unit configured to receive a stream of product, for example, from a product repository associated with an upstream process comprising one or more processing units.

In some embodiments, the future operating condition schedule comprises one or more timestamp intervals corresponding to operating condition data associated with or more scheduled events. In some embodiments, the operating condition data comprises outflow rate of a particular product. In some embodiments, the particular product is stored in a product repository configured or otherwise scheduled to supply the particular product to a downstream processing unit during performance of the one or more scheduled events. In this regards, the operating condition data may comprise outflow rate of the particular product from the product repository storing the particular product. In some embodiments, the downstream processing unit is associated with a discontinuous process, where the one or more time-stamp intervals defined by the future operating condition schedule may correspond to one or more discontinuous processing events, each associated with a particular operating mode.

According to some examples, the method includes generating an optimization adjustment data based on the corrective response model at operation 1006. In some embodiments, to generate the optimization data for a particular scheduled event at a timestamp prior to the planned start of the particular scheduled, the apparatus 200 utilizing the corrective action model, shifts the input vector parameter of the corrective action model forward or backward by an amount corresponding to the adjustment value. In this regard, shifting the input vector forward or backward corresponds to shifting the planned start time for the particular event forward or backward by an amount corresponding to the adjustment value. In some embodiments, the input vector is shifted forward to provide a failsafe against violating the upper limit threshold of a particular constraint. Additionally or alternatively, in some embodiments, the input vector is shifted backward to provide a failsafe against violating the lower limit threshold of a particular constraint.

According to some examples, the method includes generating updated optimization data at operation 1008. In some embodiments, the apparatus 200 generates updated optimization data by applying the optimization adjustment data to offset initial optimization data. In some embodiments, the updated optimization data comprises a predicted constraint value that reflects the predicted possible worst scenario of starting the scheduled event at a start time that differs from the planned start time. In some embodiments, the initial optimization data comprise optimization data generated based at least in part on one or more default assumptions, for example default assumption(s) associated with a dynamic control scheme (e.g., an MPC architecture). For example, in some embodiments, the default assumptions represents that future operating condition data will be constant over a time window for which optimization is performed.

In some embodiments, the apparatus 200 outputs the updated optimization data. In some embodiments, the apparatus 200 outputs the updated optimization data by causing rendering of the updated optimization data to at least one display associated with the apparatus 200 or a connected client device. Additionally or alternatively, in some embodiments, the apparatus 200 outputs the updated optimization data to a subsequent process for further processing.

Additionally or alternatively still, in some embodiments, the apparatus 200 outputs the updated optimization data to at least one data repository for storing the updated optimization data via the at least one data repository.

According to some examples, the method includes determining the state of the scheduled event at a sampling instance subsequent to the planned start time at operation 1010. In some embodiments, the apparatus 200 is configured determine the state of the scheduled event by assessing the corresponding processing unit to determine if the scheduled event has started.

In some embodiments, the method includes in response to determining at the sampling instance that the scheduled event has not started, adjusting the input vector parameter associated with the corrective response model and generate updated optimization data at operation 1012.

For example, in some embodiments, the apparatus 200 adjusts the input vector parameter associated with the corrective response model, and generates updated optimization data based at least in part on the corrective response model. In some embodiments, adjusting the input vector comprises shifting the input vector parameter by one sampling time while keeping the constraint failsafe parameter value the same.

In some embodiments, in response to determining at the sampling instance subsequent to the planned start time that the scheduled event has started, the apparatus 200 updates the corrective response model to exclude the adjustment value, and generates updated optimization adjustment data based at least in part on the corrective response model. In some embodiments, the apparatus 200 updates the corrective response model to exclude the adjustment value by setting the adjustment value to zero at operation.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for improved optimization associated with a dynamic control scheme in a processing plant environment comprising a processing unit configured to perform one or more processing operations, the computer-implemented method comprising:

identifying, by at least one processor, at a first timestamp prior to a planned start time of a scheduled event associated with a processing unit, an adjustment value associated with the scheduled event, wherein the adjustment value is identified based at least in part on historical operating data associated with an operating mode for the scheduled event, and wherein the adjustment value is defined based on a predicted possible worst scenario of starting the scheduled event at a start time that differs from the planned start time;

updating, by the at least one processor, a corrective response model to include the adjustment value, wherein the corrective response model comprises (i) a step response matrix associated with the scheduled event, wherein the step response matrix is dynamically generated for a particular timestamp interval corresponding to the scheduled event, (ii) an input vector parameter, wherein the input vector parameter is determined by generating an input pulse that corresponds to unit-height switching signal to identify timestep changes in vector between timestamp intervals, and (iii) a constraint failsafe parameter, wherein the constraint failsafe parameter is based on differences between the timestamp intervals for the scheduled event;

generating, by the at least one processor, using the corrective response model and based at least in part on operating condition data associated with the scheduled event, an optimization adjustment data, wherein generation of the optimization adjustment data comprises applying the corrective response model to the scheduled event, wherein applying the corrective response model includes shifting the input vector parameter forward or backward by an amount corresponding to the constraint failsafe parameter;

generating, by the at least one processor, updated optimization data by applying the optimization adjustment data to offset initial optimization data, wherein the updated optimization data comprises a predicted constraint value that reflects the predicted possible worst scenario of starting the scheduled event at a start time that differs from the planned start time;

transmitting, by the at least one processor, one or more control signals to a control device associated with the processing unit based on the updated optimization data; and in response to the one or more control signals, controlling, by the control device, one or more processing operations of the processing unit based on the updated optimization data to maintain one or more processing constraints associated with the processing unit within a defined threshold.

2. The computer-implemented method of claim 1, wherein updating the corrective response model to include the adjustment value, comprises setting the constraint failsafe parameter to the adjustment value.

3. The computer-implemented method of claim 1, further comprising:

determining, a state of the scheduled event at a sampling instance subsequent to the planned start time;

in response to determining at the sampling instance subsequent to the planned start time that the scheduled event has not started:

adjusting the input vector parameter associated with the corrective response model, and generating based at least in part on the corrective response model, updated optimization adjustment data.

4. The computer-implemented method of claim 1, further comprising:

determining, a state of the scheduled event at a sampling instance subsequent to the planned start time;

in response to determining at the sampling instance subsequent to the planned start time that the scheduled event has started:

updating the corrective response model to exclude the adjustment value; and generating, based at least in part on the corrective response model, updated optimization adjustment data.

5. The computer-implemented method of claim 1, wherein the scheduled event is discontinuous processing operation performed by the processing unit.

6. The computer-implemented method of claim 1, wherein the updated optimization data comprises predicted inventory level of a product repository that supplies a product utilized by the processing unit to perform the scheduled event.

7. The computer-implemented method of claim 1, wherein the scheduled event is associated with an operating mode of a plurality of operating modes of the processing unit.

8. The computer-implemented method of claim 7, wherein the adjustment value is determined based at least in part on historical operating data associated with operating mode associated with the scheduled event.

9. The computer-implemented method of claim 1, wherein identifying the adjustment value comprises retrieving the adjustment value from a database.

10. The computer-implemented method of claim 1, further comprising:

outputting the updated optimization data.

11. An apparatus comprising:

at least one processor and at least one memory storing instructions that, when executed by the at least one processor, cause the apparatus to:

identify, by the at least one processor, at a first timestamp prior to a planned start time of a scheduled event associated with a processing unit, an adjustment value associated with the scheduled event, wherein the adjustment value is identified based at least in part on historical operating data associated with an operating mode for the scheduled event, and wherein the adjustment value is defined based on a predicted possible worst scenario of starting the scheduled event at a start time that differs from the planned start time;

update, by the at least one processor, a corrective response model to include the adjustment value, wherein the corrective response model comprises (i) a step response matrix associated with the scheduled event, wherein the step response matrix is dynamically generated for a particular timestamp interval corresponding to the scheduled event, (ii) an input vector parameter, wherein the input vector parameter is determined by generating an input pulse that corresponds to unit-height switching signal to identify timestep changes in vector between timestamp intervals, and (iii) a constraint failsafe parameter, wherein the constraint failsafe parameter is based on differences between the timestamp intervals for the scheduled event;

generate, by the at least one processor, using the corrective response model and based at least in part on operating condition data associated with the scheduled event, an optimization adjustment data, wherein generation of the optimization adjustment data comprises applying the corrective response model to the scheduled event, wherein applying the corrective response model includes shifting the input vector parameter forward or backward by an amount corresponding to the constraint failsafe parameter;

generate, by the at least one processor, updated optimization data by applying the optimization adjustment data to offset initial optimization data, wherein the updated optimization data comprises a predicted constraint value that reflects the predicted possible worst scenario of starting the scheduled event at a start time that differs from the planned start time;

transmit, by the at least one processor, one or more control signals to a control device associated with the processing unit based on the updated optimization data; and in response to the one or more control signals, control, by the control device, one or more processing operations of the processing unit based on the updated optimization data to maintain one or more processing constraints associated with the processing unit within a defined threshold.

12. The apparatus of claim 11, wherein updating the corrective response model to include the adjustment value, comprises setting the constraint failsafe parameter to the adjustment value.

13. The apparatus of claim 11, wherein the instructions further cause the apparatus to:

determine, a state of the scheduled event at a sampling instance subsequent to the planned start time;

in response to determining at the sampling instance subsequent to the planned start time that the scheduled event has not started:

adjust the input vector parameter associated with the corrective response model, and generate based at least in part on the corrective response model, updated optimization adjustment data.

14. The apparatus of claim 11, wherein the instructions further cause the apparatus to:

determine, a state of the scheduled event at a sampling instance subsequent to the planned start time;

in response to determining at the sampling instance subsequent to the planned start time that the scheduled event has started:

update the corrective response model to exclude the adjustment value; and generate, based at least in part on the corrective response model, updated optimization adjustment data.

15. The apparatus of claim 11, wherein the scheduled event is a discontinuous processing operation performed by the processing unit.

16. The apparatus of claim 11, wherein the updated optimization data comprises predicted inventory level of a product repository that supplies a product utilized by the processing unit to perform the scheduled event.

17. The apparatus of claim 11, wherein the scheduled event is associated with an operating mode of a plurality of operating modes of the processing unit.

18. The apparatus of claim 17, wherein the adjustment value is determined based at least in part on historical operating data associated with operating mode associated with the scheduled event.

19. The apparatus of claim 11, wherein identifying the adjustment value comprises retrieving the adjustment value from a database.

20. A computer program product comprising at least one non-transitory computer-readable storage medium, the at least one non-transitory computer-readable storage medium having computer-readable program code portions stored therein, the computer-readable program code portions comprising an executable portion configured to:

identify at a first timestamp prior to a planned start time of a scheduled event associated with a processing unit, an adjustment value associated with the scheduled event, wherein the adjustment value is identified based at least in part on historical operating data associated with an operating mode for the scheduled event, and wherein the adjustment value is defined based on a predicted possible worst scenario of starting the scheduled event at a start time that differs from the planned start time;

update a corrective response model to include the adjustment value, wherein the corrective response model comprises (i) a step response matrix associated with the scheduled event, wherein the step response matrix is dynamically generated for a particular timestamp interval corresponding to the scheduled event, (ii) an input vector parameter, wherein the input vector parameter is determined by generating an input pulse that corresponds to unit-height switching signal to identify timestep changes in vector between timestamp intervals, and (iii) a constraint failsafe parameter, wherein the constraint failsafe parameter is based on differences between the timestamp intervals for the scheduled event;

generate, using the corrective response model and based at least in part on operating condition data associated with the scheduled event, an optimization adjustment data, wherein generation of the optimization adjustment data comprises applying the corrective response model to the scheduled event, wherein applying the corrective response model includes shifting the input vector parameter forward or backward by an amount corresponding to the constraint failsafe parameter;

generate updated optimization data by applying the optimization adjustment data to offset initial optimization data, wherein the updated optimization data comprises a predicted constraint value that reflects the predicted possible worst scenario of starting the scheduled event at a start time that differs from the planned start time;

transmit one or more control signals to a control device associated with the processing unit based on the updated optimization data; and in response to the one or more control signals, control, by the control device, one or more processing operations of the processing unit based on the updated optimization data to maintain one or more processing constraints associated with the processing unit within a defined threshold.

* * * * *